US008097227B2

(12) United States Patent
Hackl et al.

(10) Patent No.: US 8,097,227 B2
(45) Date of Patent: Jan. 17, 2012

(54) METHOD FOR THIOSULFATE LEACHING OF PRECIOUS METAL-CONTAINING MATERIALS

(75) Inventors: Ralph Peter Hackl, Vancouver (CA); Jinxing Ji, Burnaby (CA); Paul George West-Sells, Vancouver (CA)

(73) Assignee: Placer Dome Technical Services Limited, Vancouver (CA)

( * ) Notice: Subject to any disclaimer, the term of this patent is extended or adjusted under 35 U.S.C. 154(b) by 0 days.

(21) Appl. No.: 12/683,967

(22) Filed: Jan. 7, 2010

(65) Prior Publication Data

US 2010/0111751 A1 May 6, 2010

Related U.S. Application Data

(62) Division of application No. 10/713,640, filed on Nov. 13, 2003, now Pat. No. 7,722,840.

(60) Provisional application No. 60/426,343, filed on Nov. 15, 2002.

(51) Int. Cl.
*C22B 11/00* (2006.01)

(52) U.S. Cl. .............. 423/22; 423/23; 423/27; 423/41; 75/744

(58) Field of Classification Search ............... 423/23, 423/27, 22, 41; 75/744
See application file for complete search history.

(56) References Cited

U.S. PATENT DOCUMENTS

| 496,951 A | 5/1893 | Parkes |
| 1,627,582 A | 5/1927 | Terry |
| 3,317,313 A | 5/1967 | Biiggs |
| 3,524,724 A | 8/1970 | Every et al. |
| 3,843,771 A | 10/1974 | Urban |
| 3,902,896 A | 9/1975 | Borbely et al. |
| 3,979,207 A | 9/1976 | MacGregor |
| 4,070,182 A | 1/1978 | Genik-Sas-Berezowsky et al. |
| 4,256,706 A | 3/1981 | Heinen et al. |
| 4,269,622 A | 5/1981 | Kerley, Jr. |
| 4,289,532 A | 9/1981 | Matson et al. |
| 4,296,075 A | 10/1981 | Yan |
| 4,304,644 A | 12/1981 | Victorovich et al. |
| 4,369,061 A | 1/1983 | Kerley, Jr. |
| 4,384,889 A | 5/1983 | Wiewiorowski et al. |
| 4,411,612 A | 10/1983 | Holland |
| 4,411,873 A | 10/1983 | Yan |
| 4,489,984 A | 12/1984 | Savins |
| 4,510,027 A | 4/1985 | Wiewiorowski et al. |
| 4,552,589 A | 11/1985 | Mason et al. |
| 4,571,264 A | 2/1986 | Weir et al. |
| 4,585,561 A | 4/1986 | Zlokarnik et al. |
| 4,605,439 A | 8/1986 | Weir |
| 4,632,701 A | 12/1986 | Genik-Sas-Berezowsky et al. |
| 4,634,187 A | 1/1987 | Huff et al. |
| 4,654,078 A | 3/1987 | Perez et al. |
| 4,654,079 A | 3/1987 | Nunez et al. |
| 4,684,404 A | 8/1987 | Kalocsai |
| 4,721,526 A | 1/1988 | Elmore et al. |
| 4,723,998 A | 2/1988 | O'Neil |
| 4,738,718 A | 4/1988 | Bakshani et al. |
| 4,740,243 A | 4/1988 | Krebs-Yuill et al. |
| 4,765,827 A | 8/1988 | Clough et al. |
| 4,778,519 A | 10/1988 | Pesic |
| 4,801,329 A | 1/1989 | Clough et al. |
| 4,816,234 A | 3/1989 | Brison et al. |
| 4,816,235 A | 3/1989 | Pesic |
| 4,902,345 A | 2/1990 | Ball et al. |
| 4,913,730 A | 4/1990 | Deschenes et al. |
| 4,923,510 A | 5/1990 | Ramadorai et al. |
| 4,925,485 A | 5/1990 | Schulze |
| 4,980,134 A | 12/1990 | Butler |
| 5,051,128 A | 9/1991 | Kubo |
| 5,071,477 A | 12/1991 | Thomas et al. |
| 5,114,687 A | 5/1992 | Han et al. |
| 5,127,942 A | 7/1992 | Brierley et al. |
| 5,147,617 A | 9/1992 | Touro et al. |
| 5,147,618 A | 9/1992 | Touro et al. |
| 5,215,575 A | 6/1993 | Butler |
| 5,232,490 A | 8/1993 | Bender et al. |
| 5,236,492 A | 8/1993 | Shaw et al. |
| 5,244,493 A | 9/1993 | Brierley et al. |
| 5,246,486 A | 9/1993 | Brierley et al. |
| 5,308,381 A | 5/1994 | Han et al. |
| 5,338,338 A | 8/1994 | Kohr |
| 5,354,359 A | 10/1994 | Wan et al. |
| 5,364,453 A | 11/1994 | Kohr |
| 5,405,430 A | 4/1995 | Groves et al. |
| 5,443,621 A | 8/1995 | Kohr |
| 5,484,470 A | 1/1996 | Kristjansdottir et al. |
| 5,489,326 A | 2/1996 | Thomas et al. |
| 5,536,297 A | 7/1996 | Marchbank et al. |
| 5,536,480 A | 7/1996 | Simmons |

(Continued)

FOREIGN PATENT DOCUMENTS

AU 4576985 6/1986

(Continued)

OTHER PUBLICATIONS

U.S. Appl. No. 12/700,525, filed Feb. 4, 2010, Ji et al.
Abbruzzese et al.; "Nuove Prospettive Per II Recupero Dell'oro Dai Mineralia: La Lisciviazione Con Tiosolfata"; l'industria mineraria, No. 4, 1994; pp. 10-14.
Abbruzzese et al.; "Thiosulphate Leaching for Gold Hydrometallurgy"; Hydrometallurgy 39; 1995; pp. 265-276.
Ablimt et al.; "Study on Intensified Leaching of Gold with Thiosulfate"; Zingjiang Res Inst of Chemistry; PRC; vol. 20 (1), 1999; pp. 39-41.
Adams, M.D. et al., "Characterization and Blinding of Carbonaceous Preg-Robbers in Gold Ores", Minerals Engineering, Pegamon Press, Oxford, Great Britain, vol. 11 No. 10, Oct. 1998, pp. 919-927.
Agadzhanyan et al.; "Kinetics of Ion Exchange in Selective Systems. II. Kinetics of the Exchange of Differently charged Ions in a Macroporous ion Exchanger"; Published in the Russian Journal of Physical Chemistry; 61(7); 1987; pp. 994-997.

(Continued)

*Primary Examiner* — Steven Bos
(74) *Attorney, Agent, or Firm* — Sheridan Ross PC

(57) ABSTRACT

Processes are provided for recovering precious metals from refractory materials using thiosulfate lixiviants. The processes can employ heap leaching or lixiviants that include one or more blinding agents.

21 Claims, 6 Drawing Sheets

U.S. PATENT DOCUMENTS

| | | | |
|---|---|---|---|
| 5,607,619 A | 3/1997 | Dadgar et al. | |
| 5,626,647 A | 5/1997 | Kohr | |
| 5,653,945 A | 8/1997 | Gathje et al. | |
| 5,672,194 A | 9/1997 | Hunter et al. | |
| 5,683,490 A | 11/1997 | Earley, III et al. | |
| 5,733,431 A | 3/1998 | Green et al. | |
| 5,785,736 A | 7/1998 | Thomas et al. | |
| 5,876,588 A | 3/1999 | Lalancette et al. | |
| 5,939,034 A | 8/1999 | Virnig et al. | |
| 5,961,833 A | 10/1999 | Green et al. | |
| 6,156,186 A | 12/2000 | Mueller et al. | |
| 6,165,344 A | 12/2000 | Green et al. | |
| 6,183,706 B1 | 2/2001 | King | |
| 6,197,214 B1 | 3/2001 | Virnig et al. | |
| 6,251,163 B1 | 6/2001 | King | |
| 6,344,068 B1 | 2/2002 | Fleming et al. | |
| 6,355,175 B1 | 3/2002 | Green et al. | |
| 6,368,381 B1 | 4/2002 | King et al. | |
| 6,451,275 B1 | 9/2002 | Fleming | |
| 6,500,231 B1 | 12/2002 | Wan | |
| 6,602,319 B1 | 8/2003 | Murthy et al. | |
| 6,632,264 B2 | 10/2003 | Zhang et al. | |
| 6,641,642 B2 * | 11/2003 | Simmons et al. | 75/743 |
| 6,660,059 B2 | 12/2003 | Ji et al. | |
| 7,066,983 B2 | 6/2006 | Ji et al. | |
| 7,544,232 B2 | 6/2009 | Hackl et al. | |
| 7,559,974 B2 | 7/2009 | Ji et al. | |
| 2003/0154822 A1 | 8/2003 | Hall et al. | |
| 2004/0206207 A1 | 10/2004 | Ji et al. | |

FOREIGN PATENT DOCUMENTS

| | | |
|---|---|---|
| AU | 574818 | 7/1988 |
| AU | 1852599 | 9/1999 |
| AU | 752203 | 9/2002 |
| AU | 760740 | 5/2003 |
| AU | 783904 | 12/2005 |
| CA | 2209559 | 1/1998 |
| CA | 2315480 | 2/2001 |
| CL | 1215-93 | 1/1995 |
| CL | 1019-00 | 4/2001 |
| CL | 759-01 | 12/2001 |
| EP | 316094 | 5/1989 |
| EP | 522978 | 1/1993 |
| EP | 1433860 | 6/2004 |
| GB | 1378052 | 12/1974 |
| GB | 1423342 | 2/1976 |
| GB | 2180829 | 4/1987 |
| GB | 2310424 | 8/1997 |
| JP | 60208434 | 10/1985 |
| JP | 61127833 | 6/1986 |
| JP | 61127834 | 6/1986 |
| RO | 81261 | 2/1983 |
| SU | 1279954 | 12/1986 |
| SU | 1284942 | 1/1987 |
| WO | WO 90/15887 | 12/1990 |
| WO | WO 91/11539 | 8/1991 |
| WO | WO 94/06944 | 3/1994 |
| WO | WO 95/04164 | 2/1995 |
| WO | WO 97/49474 | 12/1997 |
| WO | WO 99/13116 | 3/1999 |
| WO | WO 01/23626 | 4/2001 |
| WO | WO 01/36333 | 5/2001 |
| WO | WO 01/42519 | 6/2001 |
| WO | WO 01/88212 | 11/2001 |
| WO | WO 02/27045 | 4/2002 |
| WO | WO 03/080879 | 10/2003 |
| WO | WO 2004/005556 | 1/2004 |
| WO | WO 2005/017215 | 2/2005 |
| ZA | 770840 | 1/1978 |

OTHER PUBLICATIONS

Anzhang, Mao et al.; "One-Step Leaching of Some Refractory Gold Concentrate Containing Arsenic and Theory Analysis," J. Cent. South Univ. Technol., vol. 4, No. 2 (Nov. 1997).

Atluri et al., "Recovery of Gold and Silver from Ammoniacal Thiosulfate Solutions Containing Copper by Resin ion Exchange Method" A Thesis Submitted to the Faculty of the Department of Materials Science and Engineering at the University of Arizona, 1987, 219 pages.

Atluri et al.; "Recovery of Silver from Ammoniacal Thiosulfate Solutions"; Published in Proceedings of a Symposium on Precious and Rare Metals held in Albuquerque, NM; Apr. 6-8, 1988; pp. 290-305.

Awadalla et al.; "Recovery of Gold from Thiourea, Thiocyanate, or Thiosulfate Solutions by Reduction-Precipitation with a Stabilized Form of Sodium Borohydride"; published in Separation Science and Technology, 26(9), 1991, pp. 1207-1228.

Axel Schippers et al., "Bacterial Leaching of Metal Sulfides Proceeds by Two Indirect Mechanisms via Thiosulfate or via Polysulfides and Sulfur," Applied and Environmental Microbiology (Jan. 1999) pp. 319-321.

Aylmore et al., "Thermodynamic Analysis of Gold Leaching by Ammoniacal Thiosulfate Using Eh/pH Speciation Diagrams"; Minerals & Metallurgical Processing, vol. 16, No. 4, Nov. 2001; pp. 221-227.

Bagdasaryan; "A Study of Gold and Silver . . . " Izvestiia Vysshikh Uchebnykh Zavedenii Tsvetnaia Metallurgiia, vol. 5, 1983; pp. 64-68.

Balasanian, Ion et al.; "Modeling a Process for Sodium Thiosulfate Production from Sulfite and Sulfur," Revista de Chimie, vol. 26, No. 6 (1975), pp. 475-479.

Bartels; "Chemical Abstract Index Compilation for Thiosalts and Related Compounds"; Report dated Nov. 1978, A1-A17; pp. 1-5.

Bartlett; "Metal Extraction from Ores by Heap Leaching"; Metallurgical and Materials Transactions B; vol. 28B, Aug. 1997; pp. 529-545.

Benedetti, Marc and Boulegue; "Mechanism of Gold Transfer and Deposition in a Supergene Environment"; Geochimica Et Cosmochimica Acta; vol. 55, 1991, pp. 1539-1547.

Bennet et al., "A Comprehensive Copper Stockpile Leach Model: Background and Model Formulation" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 315-328.

Berezowsky et al.; "Recovery of Gold and Silver from Oxidation Leach Residues by Ammoniacal Thiosulphate Leaching"; Paper presented at the 108.sup.th AIME Annual Meeting, New Orleans, Louisiana, Feb. 18-22, 1979; pp. 1-18.

Bhaduri; "Lixiviation of Refractory Ores with Diethylamine or Ammonium Thiosulfate"; A thesis submitted in partial fulfillment of the requirements for the degree of Master of Science in Metallurgical Engineering, Aug. 1987, University of Nevada, Reno.

Bhakta, P., "Ammonium Thiosulfate Heap Leaching" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 259-267.

Bhakta, P., "Measurement and Application of Bioxidation Kinetics for Heaps" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 269-273.

Bhappu, R B, "Status of Non-Cyanide Heap Leaching and Other Cyanide Substitutes"; Session Papers: American Mining Congress, Apr. 24-28, 1988, Chicago, vol. 1; pp. 275-287.

Black et al., "Towards An Understanding of Copper (I) Speciation and Reactivity in the Copper-Ammonia-Thiosulfate Lixiviant System", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 183-194.

Block-Bolten et al.; "Gold and Silver Extraction from Complex Sulfide Wastes"; Recycle and Secondary Recovery of Metals: Proceedings of the Int'l. Symposium on Recycle and Secondary Recovery of Metals and the Fall Extractive and Process Metallurgy Meeting: 1985; pp. 715-726.

Block-Bolten et al.; "New Possibilities in the Extraction of Gold and Silver from Zinc and Lead Sulfide Flotation Wastes"; TMS-AIME Fall Extractive Meeting; 1985, held in San Diego, CA; pp. 149-166.

Block-Bolten et al.; "Thiosulfate Leaching of Gold from Sulfide Wastes"; Metall. 40, Hahrgang, Heft 7, Jul. 1986; pp. 687-689.

Bouffard et al., "Mathematical Modeling of Pyritic Refractory Gold Ore Heap Biooxidation: Model Development and Isothermal Column Simulations", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 275-288.

Bourge; "Thiosulfate may replace cyanide in leaching"; American Metal Market, 107(40) Mar. 2, 1999.

Breuer et al. "A Review of the Chemistry, Electrochemistry and Kinetics of the Gold Thiosulfate Leaching Process" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 139-154.

Breuer et al.; "An Electrochemical Study of Gold Oxidation in Solutions Containing Thiosulfate, Ammonia and Copper"; Department of Chemical Engineering, Monash University, Australia, date unknown, pp. 1-11.

Breuer et al.; "Thiosulfate Leaching Kinetics of Gold in the Presence of Copper and Ammonia"; Minerals Engineering, vol. 15, No. 10-11, 2000 Present at Hydromet 100, Adelaide, Australia, Apr. 2000, pp. 1071-1081.

Breuer et al.; Fundamental Aspects of the Gold Thiosulfate leaching Process, to be presented at TMS Meeting, Feb. 2001.

Briones et al.; "The Leaching of Silver Sulfide with the Thiosulfate—Ammonia—Cupric Ion System"; Hydrometallurgy 20, 1998, pp. 243-260.

Brown et al., "Alternative Copper (II) Catalysts for Gold Leaching: Use of Multidentate Ligands to Control THiosulfate Oxidation" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 213-226.

Byerley et al.; "Activation of Copper (II) Ammine Complexes by Molecular Oxygen for the Oxidation of Thiosulfate Ions"; journal of Chemical Society: Dalton transactions, 1975; pp. 1329-1338.

Byerley et al.; "Kinetics and Mechanism of the Oxidation of Thiosulphate Ions by Copper—(ii) Ions in Aqueous Ammonia Solution"; pp. 889-894.

Byerley et al.; "The Oxidation of Thiosulfate in Aqueous Ammonia by Copper (II) Oxygen Complexes"; Inorg. Nucl. Chem. Letters, vol. 9, 1973, pp. 879-883.

Calistru, C. et al.; "Modelling of the Production of Sodium Thiosulfate From Sulfite and Sulfur," Revista de Chimie, vol. 25, No. 3 (1974), pp. 197-200.

Caney, D.J.; "Thiosulfate shows leach promise—U.S. government study shows costs about the same as cyanide," American Metal Market, vol. 102, No. 196 (Oct. 11, 1994), p. 7.

Chanda et al.; "Ion-Exchange Sorption of Thiosulfate and Tetrathionate on Protonated Poly (4-Vinyl Pyridine)"; Reactive Polymers, 2, 1984; pp. 269-278.

Chandra et al., "Can A Thiosulfate Leaching Process Be Developed Which Does Not Require Copper and Ammonia", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 169-182.

Changlin et al.; "Leaching Gold by Low Concentration Thiosulfate Solution"; Published in Transactions of NFsoc, vol. 2, No. 4, Nov. 1992; pp. 21-25.

Chen et al; "Electrochemistry of Gold Leaching with Thiosulfate (I) Behaviour and Mechanism of Anodic Dissolution of Gold"; J. Cent. South Inst. Min. Metall. vol. 24, No. 1, Apr. 1993 (Published in Chinese); pp. 169-173.

Chen, Yougang et al.; "Production of Sodium Thiosulfate From Reduced Waste Liquor Containing Sodium Sulfide," Chemical World, vol. 31, No. 3 (1990), pp. 130-132.

Cosano, J.S. et al.; "Methods for Online Monitoring to be Implemented in an Ammonium Thiosulfate Production Plant," Analytica Chimica Acta, vol. 308, No. 1-3 (1995), pp. 187-196.

Danehy, James P. et al.; "Iodometric Method for the Determination of Dithionite, Bisulfite, and Thiosulfate in the Presence of Each Other and Its Use in Following the Decomposition of Aqueous Solutions of Sodium Dithionite," Analytical Chemistry, vol. 46, No. 3 (1974), pp. 391-395.

Das, Tomi Nath et al.; "Reduction Potentials of $SO_3.Bu1-$, $SO_5.Bu1.-$, and $S_4O_6.Bu1.3$—Radicals in Aqueous Solution," The Journal of Physical Chemistry, vol. 103, No. 18 (1999), pp. 3581-3588.

de Jong et al.; "Polythionate Degradation by Tetrathionate Hydrolase of *Thiobacillus* Ferrooxidans"; Mirobiology (1997), 143, pp. 499-504.

Dhawale; "Thiosulfate—An Interesting Sulfur Oxoanion That Is Useful in Both Medicine and Industry—But Is Implicated in Corrision"; Journal of Chemical Education; vol. 70, No. 1, Jan. 1993; pp. 12-14.

Dixon, D., "Heap Leach Modeling—The Current State of the Art", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 289-314.

Ege, Guenes N. et al.; "PVP—A Practical Stabilizer for Technetium-99M-Sulfur Colloid," Journal of Nuclear Medicine, vol. 11, No. 4 (1970), pp. 175-176.

Feng et al.; "Elution of Ion Exchange Resins by Use of Ultrasonication"; Hydrometallurgy, 55 (2000); pp. 201-212.

Feng, D. et al.; "Galvanic Interactions Between Sulphides and Manganese Dioxide in Thiosulphate Leaching of Gold Ores," Department of Chemical Engineering, The University of Melbourne, Victoria, date unknown, pp. 1-39.

Ferron et al.; "Thiosulphate Leaching of Gold and Silver Ores: An Old Process Revisited"; Presented at 100.sup.th CIM Annual General Meeting, held in Montreal, Quebec, Canada May 3-7, 1998.

Ficeriov et al.; "Cyanideless Methods of Leaching of the Gold and Silver Concentrate Coming from Hodrusa After Pretreatment by Ultrafine Grinding"; Mineralia Slovaca, vol. 31 No. 3-4, 1999; pp. 363-368.

Filho et al.; "Contribuica Ao Estudo Da Dissoluca Do Ouro Pelo Tiossulfato", 49.sup.th International Congress on the Technology of Metals and Materials held in Sao Paulo Brazil, Mineral Technology, vol. IV, Oct. 1994; pp. 265-279.

Fleming et al.; "Recent Advances in the Development of an Alternative to the Cyanidation Process—Based on Thiosulphate Leaching and Resin in Pulp"; Paper presented at Ballarat, Nov. 2000.

Flett et al.; "Chemical Study of Thiosulphate Leaching of Silver Sulphide"; Trans. Instn. Min. Metall. 92; Dec. 1983; pp. C216-C223.

Foss et al.; "Displacement of Sulphite Groups of Polythionates by Thiosulphate"; Acta Chem. Scand. 15, 1961 No. 1; pp. 1608-1611.

Gadalla Ahmed M. et al.; "Characterization of the Product of the Thiosulfate Process for Desulfurization of Flue Gases," Industrial & Engineering Chemistry Research, vol. 33, No. 5 (1994), pp. 1145-1149.

Gallagher et al.; "Affinity of Activated Carbon Towards Some Gold (I) Complexes"; Hydrometallurgy, 15, 1990, pp. 305-316.

Gallagher; "Interaction of Gold Cyanide, Thiocyanate, Thiosulfate, and Thiourea Complexes with Carbon Matrices"; A thesis submitted in partial fulfillment of the requirements for the degree of Master of Science in Metallurgical Engineering, May 1987, University of Nevada, Reno.

Gelves et al.; "Recovering of Refractory Gold Using Ammonium Thiosulfate Solutions"; Clean Technology for the Mining Industry, Proceeding of the III International Conference on Clean Technologies for the Mining Industry held in Santiago, Chile, May 15-17, 1996; pp. 477-487.

Goldhaber; "Experimental Study of Metastable Sulfur Oxyanion Formation During Pyrite Oxidation at pH 6-9 and 30.degree. C"; American Journal of Science; vol. 283, Mar. 1983; pp. 193-217.

Groudev et al.; "Extraction of Gold and Silver from Oxide Ores by Means of a Combined Biological and Chemical Leaching"; Biohydrometallurgical Technologies: Proceedings of an International Biohydrometallurgy Symposium, held in Jackson Hole, Wyoming, Aug. 22-25, 1993; pp. 417-425.

Groudev et al.; "Pilot Scale Microbial Leaching of Gold and Silver from an Oxide in Eishitza Mine, Bulgaria"; Mineral Bioprocessing II: Proceedings of the Engineering Foundation Conference Minerals Processing II, held in Snowbird, Utah, Jul. 10-15, 1995; pp. 35-144.

Groudev et al.; "Two-Stage Microbial Leaching of a Refractory Gold-Bearing Pyrite Ore"; Minerals Engineering, vol. 9, No. 7, 1996; pp. 707-713.

Groudev, et al.; "A Combined Chemical and Biological Heap Leaching of an Oxide Gold-Bearing Ore"; Physicochemical Problems of Mineral Processing, 33, pp. 55-61 1999.

Guerra et al.; "A Study of the Factors Affecting copper Cementation of Gold from Ammoniacal Thiosulphate Solution"; Hydrometallurgy 51 (1999); pp. 155-172.

Guerra; "A Study of the Factors Affecting Copper Cementation of Gold from Ammoniacal Thiosulphate Solution", A Thesis submitted in partial fulfillment of the requirements for the Degree of Master of Applied Science in the faculty of graduate studies, Nov. 1997; pp. 1-74.

Gundiler et al.; "Thiosulphate leaching of Gold from Copper-Bearing Ores"; Presented at the SME annual Meeting held in Reno, Nevada, Feb. 15-18, 1993.

Han et al.; "Factors Influencing the Rate of Dissolution of Gold in Ammoniacal Solutions"; Int. J. Miner. Process. 58, 2000; pp. 369-381.

Hemmati et al.; "Study of the Thiosulphate Leaching of Gold from Carbonaceous Ore and the Quantitative Determination of Thiosulphate in the Leached Solutions"; Papers presented at the Extraction'89 symposium, organized by The Institution of Mining and Metallurgy and held in London, from Jul. 10-13, 1989; pp. 665-678.

Hemmati; "A Study of the Thiosulfate Leaching of Gold from Carbonaceous Ore and the Quantitative Determination of Thiosulfate in the Leached Solution"; A thesis submitted in partial fulfillment of the requirements for the degree of Master of Science in Metallurgical Engineering, Apr. 1987, University of Nevada, Reno.

Hiskey, J. Brent et al.; "Dissolution Chemistry of Gold and Silver in Different Lixiviants," Mineral Processing and Extractive Metallurgy Review, vol. 4, pp. 95-134. Dec. 1988.

Hitchen et al.; "A Review of Analytical Methods for the Determination of Polythionates, Thiosulphate, Sulphite and Sulphide in Mining Effluents"; Report dated Aug. 1976; pp. 1-23.

Hitchen; "Preparation of Potassium Tetrathionate and Potassium Trithionate for Studies of the Thiosalt Problem in Mining Effluents"; Report dated Oct. 1976; pp. 1-5.

Huang et al.; "Theory and Practice of Leaching Gold by Thiosulfate"; South Inst of Metallurgy PRC; vol. 19(9):1998; pp. 34-36.

Idriss et al.; "A New Method for the Macro-and Microdetermination of Tri-and Tetrathionate"; Can. J. Chem., col. 55, 1977; pp. 3887-3893.

Jacobson, R.H. et al.; "Gold Solution Mining," Proceedings of a Symposium on Precious and Rare Metals, Albuquerque, NM, Apr. 6/8, 1988, pp. 157-174.

Jagushte et al.; "Insight Into Spent Caustic Treatment: On Wet Oxidation of Thiosulfte to Sulfate"; J. Chem Technol. Biotechnol; 74 (1999); pp. 437-444.

Ji et al., "A Novel THiosulfate System for Leaching Gold Without the Use of Copper and Ammonium", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 227-244.

Ji et al.; Research and Optimization of Thiosulfate leaching Techology of Gold; published in Rare Metals (A Chinese Journal of Science, Technology & Applications in the Field of Rare Metals); vol. 10, No. 4, Oct. 1991; pp. 275-280.

Jia, Xueshun et al.; "Reductive Cleavage of S-S Bond by Samarium Diiodide: A Novel Method for the Synthesis of Disulfides," Synthetic Communications, vol. 24, No. 20 (1994), pp. 2893-2898.

Jian et al.; "Leaching Gold and Silver by Lime-Sulphur-Synthetic-Solution (LSSS)"; Xian Inst. Metall. Constr. Eng., vol. 16, 1992; pp. 389-393.

Jiang et al.; "A Kinetic Study of Gold Leaching with Thiosulfate"; Hydrometallurgy, Fundamentals, Technology and Innovations; AIME, Chapter 7, 1993; pp. 119-126.

Jiang et al.; "Anodic Oxidation of Thiosulfate Ions in Gold Leaching"; J. Cent. South Univ. Technol., vol. 4, No. 2; Nov. 1997; pp. 89-91.

Jiang et al.; "Electrochemistry and Mechanism of Leaching Gold with Ammoniacal Thiosulphate"; The Australasian Institute of Mining and Metallurgy Publication Series No. 3/93, vol. 5 Gold Processing, Hydrometallurgy and Dewatering and Miscellaneous; pp. 1141-1146 1993.

Jiang et al.; "Gold and Silver Extraction by Ammoniacal Thiosulfate Catalytical Leaching at Ambient Temperature"; Proceedings of the first International Conferences on Modern Process Mineralogy and Mineral Processing held in Beijing, China, Sep. 22-25, 1992, pp. 648-653.

Jiang et al.; "Regularities of Thiosulfate Consumption and Leaching of Copper-Bearing Gold Ore"; Mining and Metallurgical Engineering, vol. 16, No. 1, Mar. 1996; pp. 46-48.

Jiang et al.; "Self-Catalytic Leaching of Gold . . . "; Nonferrous Metals, vol. 44(2), 1992; pp. 30-39.

Jiexue et al.; "Recovery of Gold from Thiosulfate Solution"; Engineering Chemistry and Metallurgy; vol. 10, No. 2, May 1989; pp. 45-50.

Jiexue et al.; "Substitution of Sulfite with Sulfate in the Process of Extracting Gold by Thiosulfate Solution"; Engineering Chemistry & Metallurgy; vol. 12, No. 4; Nov. 1991; pp. 302-305.

Johnson, Paul H. et al., "Chemical Mining—A Study of Leaching Agents" New Mexico Bureau of Mines and Mineral Resources (1969), pp. 1-10.

Johnston, Francis et al.; "Rates of Sulfur Production in Acid Thiosulfate Solutions Using Sulfur-35," Journal of Colloid and Interface Science, vol. 42, No. 1 (1973), pp. 112-119.

Kaczmarek, Tadeusz et al.; "Chrystalline Sodium Thiosulfate Production in a Pilot Plant," Przemysl Chemiczny, vol. 64, No. 12 (1985), pp. 593-596.

Kaczmarek, Tadeusz et al.; "Up-To-Date Method of Chrystalline Sodium Thiosulfate Production," Przemysl Chemiczny, vol. 64, No. 9 (1985), pp. 431-434.

Kametani, Hiroshi et al.; "Separation and Identification of Sulfate," Journal of Mining and Metallurgical, vol. 103 (1987), pp. 799-804.

Kelly; "Oxidation of Thiosulphate During Chromatography in the Presence of Copper of Gold Ions"; Journal of Chromatography; col. 66,(1)J., 1972; pp. 185-188.

Kim et al.; "Extraction of Gold from a Gold Ore by Ammonium Thiosulphate Leaching"; J of the Korean Inst. of Metals, vol. 28, No. 12 (1990), pp. 1048-1053.

Koh et al.; "Spectrophotometric Determination of Total Amounts of Polythionates (tetra-, Penta-, and Hexathionate) in Mixtures with Thiosulfate and Sulfite"; Analytical Chemistry, vol. 45, Oct. 12, 1973; pp. 2018-2022.

Koh, Tomozo et al.; "The Determination of Micro Amounts of Polythionates," Anal. Chin. Acta, vol. 61, pp. 451-460. Dec. 1972.

Kononova et al.; "Sorption Recoveryj of Gold from Thiosulphate Solutions After Leaching of Products of Chemical Preparation of Hard Concentrates"; Hydrometallurgy vol. 59, Jan. 2001; pp. 115-123.

Kravetz, "Cyanide Destruction Using Catalyzed Thiosulfates," Cherokee Chemical Engineering Company, Inc., date unknown, 4 pages.

Kucha et al.; Gold-Pyrite Association-Results of Oxysulphide and Polysulphide Transport of Gold; Trans. Instn. Min. Metall. (Sect. B: Appl. Earth Sci.) 103, Sep.-Dec. 1994.

Lam et al., "The Importance of the Cu (II) Catalyst in the THiosulfate Leaching of Gold" Hydrometallurgy 2003—Fifth International Conference in Honor of Professor Ian Ritchie—vol. 1: Leaching and Solution Purification, Edited by C.A. Young, A.M. Alfantazi, C.G.

Anderson, D.B. Dreisinger, B. Harris and a. James TMS (The Minerals, Metals & Materials Society), 2003, pp. 195-211.

Lan et al.; "Recovery of Gold by Thiosulfate and LSSS"; Proceedings of the twenty-first International Precious Metals Conference held in San Francisco, California; 1997; p. 185.

Langhans et al.; "Copper-Catalyzed Thiosulfate Leaching of Low-Grade Gold Ores"; Hydrometallurgy, 29, 1992; pp. 191-203.

Langhans et al.; "Gold Extraction from Low Grade Carbonaceous Ore Using Thiosulfate"; Practical Aspects of International Management and Processing, SME, 1996; pp. 85-94.

Levenson et al.; "The Stability of Concentrated Thiosulphate solutions at High Temperature. Part II. The Loss of the Sulphite"; The Journal of Photographic Science, vol. 13, 1965; pp. 79-81.

Li et al.; "Copper Catalyzed Ammoniacal Thiosulfate Leaching of Gold and Silver—Solution Chemistry"; date unknown, 34 pages.

Li et al.; "Important Solution Chemistry Factors That Influence the Copper-Catalyzed Ammonium Thiosulfate Leaching of Gold"; Presented at the 125.sup.th SME Annual Meeting held in Pheonix, Arizona, Mar. 11-14, 1996; pp. 1-20.

Li et al.; "Leaching Gold with Thiosulphate Solution Containing Added Sodium Chloride and Sodium Dodecyl Sulphonate" Engineering Chemistry & Metallurgy, vol. 19, No. 1, Feb. 1998; pp. 76-82.

Li et al.; "Studies on a United Non-Toxic Process to Recover Au/Cu from Complex Gold Ores Bearing Copper"; Journal of Xiangtan Mining Institute, vol. 14, No. 2, 1999; pp. 50-54.

Li et al.; "The Ammoniacal Thiosulfate System for Precious Metal Recovery"; Published in the Proceedings of the XIX International Mineral Processing Congress, Precious Metals Processing and Mineral Waste and the Environment, vol. 4, 1995, Chapter 7; pp. 37-42.

Lukomskaya; "Extraction of Copper Gold and Silver from Tailings by Thiosulfate Heap Leaching."; Tsvetnye Metally, No. 4, Apr. 4, 1999; p. 48-49.

Makhija et al.; "Determination of Polythionates and Thiosulphate in Mining Effluents and Mill Circuit Solutions"; Talanta, vol. 25, 1978; pp. 79-84.

Makhija et al.; "The Titrimetric Determination of Sulphate, Thiosulphate and Polythionates in Mining Effluents"; Report dated Feb. 1978, pp. 1-14.

Makhija, Ramesh; "The Determination of Polythionates and Thiosulphate in Mining Effluents and Mill Circuit Samples," Mineral Sciences Laboratories Report MRP/MSL 76-361 (TR) (Dec. 1976), pp. 1-9.

Marcus; "The Anion Exchange of Metal Complexes—The Silver—Thiosulphate System"; Published in the ACTA Chemica Scandinavica 11 (1957); pp. 619-627.

McPartland et al.; "Concentration and Reduction of Au(I) Thiosulfate to Metallic Gold"; Metal Separation Technologies Beyond 2000: Integrating Novel Chemistry with Processing. ed. By K.C. Liddell and D.J. Chaiko, TMS, 1999; pp. 105-115.

McPartland et al.; "Leaching of precious Metal Ores Using Thiosulfate"; Metal Separation Technologies Beyond 2000: Integrating Novel Chemistry with Processing, ed. By K.C. Liddell and D.J. Chaiko, TMS 1999; pp. 93-103.

Meyer et al.; "Raman Spectrometric Study of the Thermal Decomposition of Aqueous Tri- and Tetrathionate"; Phosphorus and Sulfur, vol. 14, 1982; pp. 23-36.

Michel et al.; "Integration of Amino Acids in the Thiosulfate Gold Leaching Process"; Randol Gld & Silver Forum, 1999; pp. 99-103.

Michel, Didier et al.; "Electrochemical Investigation of the Thiosulfate Gold Leaching Process," presented at CIM Gold Symposium, Montreal 98, May 1998, 12 pages.

Mizoguchi et al.; "The Chemical Behavior of Low Valence Sulfur Compounds.X. .sup.1) Disproportionation of Thiosulfate, Trithionate, Tetrathionate and Sulfite Under Acidic Conditions"; Bulletin of the Chemical Society of Japan, vol. 49(1), 1976; pp. 70-75.

Molleman, Ellen et al., "The Treatment of Copper-Gold Ores by Ammonium Thiosulfate Leaching", Hydrometallurgy, Elsevier Science, vol. 66 No. 1-3, Oct. 2002, pp. 1-21.

Murthy et al.; "Leaching of Gold and Silver and Miller Process Dross Through Non-Cyanide Leachants"; Hydrometallurgy 42, 1996; pp. 27-33.

Murthy; "Some Studies on the Extraction of Gold and Silver from Lead-Zinc Sulphide Flotation Tailings through Non-Cyanide Leachants"; Trans. Indian inst. Met. vol. 44, No. 5, Oct. 1991; pp. 349-354.

Naito et al.; "The Chemical Behavior of Low Valence Sulfur Compounds. III. Production of Ammonium Sulfamate by the Oxidation of Ammonium Thiosulfate"; Bulletin of the Chemical Society of Japan; vol. 43, 1970; pp. 1365-1372.

Naito et al.; "The Chemical Behavior of Low Valence Sulfur Compounds. V. Decomposition and Oxidation of Teratathionate in Aqueous Ammonia Solution"; Bulletin of the Chemical Society of Japan, vol. 43, 1970; pp. 1372-1376.

Naito et al.; "The Reactions of Polythionates Kinetics of the Cleavage of Trithionate Ion in Aqueous Solutions"; J. inorg. Nucl. Chem., vol. 37, 1975; pp. 1453-1457.

Nicol et al.; "Recovery of Gold From Thiosulfate Solutions and Pulps With Ion-Exchange Resins"; presented at TMS Annual Meeting, New Orleans, LA Feb. 11-15, 2001.

Niinae et al.; "Preferential Leaching of Cobalt, Nickel and Copper from Cobalt-rich Feromanganese Crusts with Ammoniacal Solutions using Ammonium Thiosulfate and Ammonium Sulfite as Reducing Agent"; Hydrometallurgy, vol. 40, 1996; pp. 111-121.

No Author; "And So Does a Novel Lixiviant"; Chemical Engineering, vol. 102(3), Mar. 1995; p. 25.

No Author; "Gold Extraction Method Offers Companies an Alternative to Cyanide"; JOM: The Journal of the Minerals, Metals & Materials Society, vol. 46(11), Nov. 1994; p. 4.

Nord et al.; "The Oxidation of Thiosulfate by the Tetramminegold (III) ion in Aqueous Solution"; Acta Chemica Scandinavica A 29, 1975; pp. 505-512.

Osaka et al.; Electrodeposition of Soft Gold from a Thiosulfate-Sulfite Bath for Electronics Applications; J. Electrochem. Soc., vol. 144, No. 10, Oct. 1997; pp. 3462-3469.

Panayotov; "A Technology for Thiosulphate Leaching of Au and Ag from Pyrite Concentrates"; Changing Scopes in Mineral Processing: proceedings of the 6.sup.th International Mineral Processing Symposium, Kusadasi, Turkey, Sep. 24-26, 1996; pp. 563-565.

Pedraza et al.; "Electro-Oxidation of Thiosulphate Ion on Gold-study by means of Cyclic Voltammetry and Auger Electron Spectroscopy"; J. Electroanal. Chem., 250, 1988; pp. 443-449.

Qian et al.; "Kinetics of Gold Leaching from Sulfide Gold Concentrates with Thiosulfate Solution"; Transaction of Nfsoc vol. 3, No. 4, Nov. 1993; pp. 30-36.

Qian et al.; "Treatment of sulphide Gold Concentrate Containing Copper with Thiosulfate Solution" (published in Chinese), Engineering Chemist, vol. Iss; 11,May 2, 1990; pp. 145-151.

Qian et al.; "Treatment of Sulphide Gold Concentrate Containing Copper with Thiosulfate Solution"; Proceedings of Randol Gold Conference, Sacramento 1989; pp. 131-135.

Rolia et al.; "Oxidation of Thiosalts with Hydrogen Peroxide"; Report dated May 1984; pp. 1-26.

Rolia et al.; "The Kinetics of Decomposition of Tetrathionate, Trithionate and Thiosulphate in Alkaline Media"; Report dated Mar. 1981, pp. 1-34.

Rolia et al.; The Oxidation of Thiosulphate by Hyrogen Peroxide in Alkaline Solution; Report dated Jul. 1984; pp. 1-14.

Rolia, E. et al.; "Effect of pH and Retention Time on the Degradation of Thiosalts," CANMET Mineral Sciences Laboratories Report MRP/MSL 79-8 (TR) (Jan. 1979), pp. 1-16.

Rolia, E. et al.; "Oxidation of Thiosalts by S02 Plus Air, Charcoal Plus Air, and Chlorine," CANMET Mineral Sciences Laboratories Report MRP/MSL 79-85 (TR) (Jun. 1979), p. 8-12.

Rolia; "Kinetics of Decomposition of Tetrathionate, Trithionate and Thiosulphate in Alkaline Media"; Environ. Sci. Technol. 1982, 16; pp. 852-857.

Rolia; "The Kinetics of Decomposition of Tetrathionate, Trithionate and Thiosulphate in Alkaline Solution"; A Thesis submitted to the School of Graduate Studies in partial fulfillment of the requirements for the Degree of Master of Science Carleton University, Sep. 1981; pp. 1-170.

Rolia; "The Kinetics of Decomposition of Thiosalts by Metallic Iron"; Report dated Jun. 1981; pp. 1-19.

Rolia; "The Oxidation of Thiosalts in Strongly Alkaline Media"; Report dated Nov. 1981; p. 28.

Rong Yu Wan et al., "Research and Development Activities for the Recovery of Gold from Noncyanide Solutions," Hydrometallurgy Fundamentals, Technology and Innovation (J.B. Hisky & G.W. Warren, Eds. 1993) pp. 415-436.

Schmitz, P. A., "Ammoniacal thiosulfate and sodium cyanide leaching of preg-robbing Goldstrike ore carbonaceous matter," Elsevier, Hydrometalurygy 60 (2001) pp. 25-40, 2001.

Senanayake et al., Thermodynamic Studies of the Gold (III) (I)/(0) Redox System in Ammonia—Thiosulphate Solutions at 25° C., Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 155-168.

Siu et al.; "Kinetics of Reaction of Sulfide with Thiosulfate in Aqueous Solution"; Ind. Eng. Chem. Res., 1999, 38; pp. 1306-1309.

Smith et al.; "Aqueous Solution Chemistry of Polythionates and Thiosulphate: A Review of Formation and Degradation Pathways"; Mineral Sciences Laboratories Report MRP/MSL 76-223 (LS), Canmet, Aug. 1976; pp. 1-29.

Steudel et al.; "The Molecular Nature of the Hydrophilic Sulfur Prepared from Aqueous Sulfide and Sulfite (Selmi Sulfur Sol)"; Z. Naturforsch. BC, 1989, 44:4; pp. 526-530.

Steudel, Ralf et al.; "The Moledular Composition of Hydrophilic Sulfur Sols Prepared by Acid Decomposition of Thiosulfate," Zeitschrift Fur Naturforschung, vol. 43, No. 2 (1988), pp. 203-218.

Subramanian et al. (1980) 'Reverse Osmosis Separation of Thiosalts from Mining Effluents', Separation Science and Technology, 15: 5, 1205-1211.

Sullivan et al.; "The Autocatalytic Deposition of Gold in Nonalkaline, Gold Thiosulfate Electroless Batch"; J. Electrochem. Soc., vol. 142, No. 7, Jul. 1995; pp. 2250-2255.

Ter-Arakelyan et al.; "Technological Expediency of Sodium Thiosulphate for the Extraction of Gold from Ores"; Soviety Non-Ferrous Metals Research, vol. 12, No. 5, 1984; pp. 393-397.

Ter-Arakelyan, et al.; "Sodium Thiosulfate An Extraction of"; Izvestiia Vysshikh Uchebnykh Zaedenii, Tsvetnaia Metallurgiia, vol. ISS 5, 1984; pp. 72-76.

Tozawa et al., "Dissolution of Gold in Ammoniacal Thiosulfate Solution"; Metallurgical Society AIME, 1981, pp. 1-12 and cover.

Tykodi; "In Praise of Thiosulfate"; Journal of Chemical Education, 1990, vol. 68; pp. 146-149.

Umetsu et al.; "Dissolution of Gold in Ammoniacal Sodium Thiosulfate Solution"; AIME World Lead-Zinc Symposium, vol. II, 1970; pp. 97-104.

Vandeputte et al.; "Influence of the Sodium Nitrate Content on the Rate of the Electrodeposition of Silver from Thiosulphate Solutions"; Electrochimica Acta. vol. 42, Nos. 23-24, 1997; pp. 3429-3441.

von Michaelis et al.; "The Prospects for Alternative Leach Reagents-Can Precious metals Producers Get Along With Cyanide?"; Engineering and Mining Journal, Jun. 1987; pp. 42-47.

Wan et al.; "Thiosulfate Leaching Following Biooxidation Pretreatment for Gold Recovery from Refractory Carbonaceous-Sulfidic Ore"; Mining Engineering, Aug. 1997; pp. 76-80.

Wan R.Y. et al., "Solution Chemistry Factors for Gold Thiosulfate Heap Leaching," International Jounral of Mineral Processing, (Jul. 1, 2003), pp. 311-322.

Wan; "Importance of Solution Chemistry for Thiosulphate Leaching of Gold"; Presented at the World Gold '97 Conference in Singapore, Sep. 1-3, 1997; pp. 159-162.

Wang et al.; "A Novel Gold Electroplating System: Gold (I)-Iodide-Thiosulfate"; J. Electrochem. Soc., vol. 145, No. 3, Mar. 1998.

Wang; "Thermodynamic Equilibrium Calculations on Au/Ag-Lixiviant Systems Relevant to Gold Extraction from complex Ores"; Proceedings of the Third International Symposium on Electrochemistry in Mineral and Metal Processing III; 1992, pp. 452-477.

Webster; "Thiosulphate Complexing in Gold and Silver During the Oxidation of a Sulphide-Bearing Carbonate Lode System, Upper Ridges Mine, P.N.G."; The Aus. I.M.M. Perth and Kaigoorlie Branches, Region conference on Gold-Mining Metallurgy and Geology, Oct. 1984; pp. 437-445.

Wenge et al.; "Studies on Leaching Gold and Silver from Gold Concentrates and Silver Pyrites Associated with Complex Metals Sulphides by Ammoniacal Thiosulfate" (published in Chinese); Non Ferrous Metals, vol. 39, No. 4, Nov. 1987; pp. 71-76.

Wentzien et al.; "Thiosulfate and Tetrathionate Degradation as well as Biofilm Generation by *Thiobacillus* Intermedius and *Thiobacillus* Versutus Studied by Microcalorimetry, HPLC, and Ion-pair Chromatography"; Arch Microbiol. 161, 1994; pp. 116-125.

West-Sells et al., "A Process for Counteracting the Detrimental Effect of Tetrathionate on Resin Gold Adsorption From Thiosulfate Leachates", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 245-256.

Yang et al.; "Leaching Gold from Refractory Gold Ore Bearing Arsenic by Thiosulfate Process"; Journal of Yunnan University, 19:5, 1997; pp. 508-514.

Yang, Ming et al.; "Application of Catalytic Oxidation to PR," Guangxi Chemical Industry, vol. 28 (1999), pp. 18-19, 25.

Yen et al.; "Development in Percolation Leaching with Ammonium Thiosulfate for Gold Extraction of a Mild Refractory Ore"; EPD Congress 1999, The Minerals & Materials Society, 1999, Paper at the TMS, Mar. 1-3, 1999, held in San Diego, California; pp. 441-455.

Yen et al.; "Gold Extraction from Mildly Refractory Ore Using Ammonium Thiosulphate"; International Symposium of Gold Recovery, May 4-7, 1998, Montreal, Quebec, Canada.

Yokosuka et al.; "Chemical Behaviour of Low-Valent Sulfur Compounds XII Oxidation of Sodium Thiosulfate with Hydrogen Peroxide and Sodium Hypochlorite"; Journal of the Japan Chemistry Society, 11, 1975; pp. 1901-1909.

Zhang "Oxidation of Refractory gold Concentrates and Simultaneous Dissolution of Gold in Aerated Alkaline Solutions", Thesis, Murdock University, Australia, Mar. 2004, 358 pages.

Zhang et al.; "Gold Extraction by Ammoniacal Thiosulfate Leaching from the Roasted Copper-Bearing Sulphureous Gold Concentrate"; Huangjin Bianjibu, PRC; vol. 20 (7), 1999; pp. 32-35.

Zhao et al.; "Extraction of gold from thiosulfate solutions using amine mixed with neutral donor reagents"; Hydrometallurgy 48, 1998; pp. 133-144.

Zhao et al.; "Extraction of gold from thiosulfate sulutions with alkyl phosphorus esters"; Hydrometallurgy 46 (1997) pp. 363-372.

Zhao et al.; "Gold Extraction from Thiosulfate Solutions Using Mixed Amines"; Solvent Extraction and Ion Exchange, 16(6), 1998; pp. 1407-1420.

Zhu et al.; "Electrochemical Studies on the Mechanism of Gold Dissolution in Thiosulfate Solutions"; Transactions of NFsoc, vol. 4, No. 1, 1991; pp. 50-53.

Zhu et al.; "Oxidation Kinetics of Thiosulfate and Polysulfide Mixture"; Engineering Chemistry & Metallurgy; vol. 17, No. 1, 1996; pp. 26-31.

Zhu, Guocai et al. "Leaching of Gold from Sulfide Concentrates with Thiosulfate/Polysulfide Produced by Disproportionation of Elemental Sulfur in Ammoniacal Media," Papers Presented at the International Symposium Hydrometallurgy '94, pp. 541-546.

Zhuchkov et al.; "Copper Sulfide Dissolution Kinetics in Thio . . . "; Izvestiia Vysshikh Uchebnykh Zavedenii Tsvetnaia Metallurgiia, vol. ISS 5-6, 1992, pp. 56-62.

Zilberman et al.; "Decomposition of polythionates"; Russian Journal of Inorganic Chemistry, vol. 14, No. 8, 1969; pp. 1203-1204.

Zipperian et al.; "Gold and Silver Extraction by Ammoniacal Thiosulfate Leaching from a Ryolite Ore"; Hydrometallurgy, vol. 19, 1988 pp. 361-375.

"Background of the Invention" for the above-identified patent application (previously provided).

International Search Report for counterpart PCT application PCT/IB 03/06475 dated Jun. 30, 2006.

PCT Invitation to Pay Additional Fees, received in PCT/IB 03/06475 on May 4, 2006.

Written Opinion for counterpart PCT application PCT/IB 03/06475 dated Oct. 19, 2006.

Internationl Preliminary Examination Report for counterpart PCT application PCT/IB 03/06475 dated Dec. 13, 2006.

Official Action for Argentine Patent Application No. P030104232.
Notice of Acceptance for Australian Patent Application No. 2003302110, mailed Sep. 19, 2007.
Examiner's Report for Australian Patent Application No. 2007211912, mailed Dec. 7, 2007.
Notice of Acceptance for Australian Patent Application No. 2007211912, mailed Jan. 16, 2008.
UK Patent Office Examination Report Report on UK Patent Application No. GB0509741.5, mailed Dec. 22, 2005.
UK Search and Examination Report (GB 0509741.5), dated Apr. 13, 2006, in copending related application.
UK Patent Office Examination Report on UK Patent Application No. GB0509741.5, mailed Oct. 4, 2006.
UK Patent Office Combined Search and Examination Report on UK Patent Application No. GB0612107.3, mailed Oct. 4, 2006.
UK Patent Office Combined Search and Examination Report on UK Patent Application No. GB0612108.1, mailed Oct. 4, 2006.
UK Patent Office Search and Examination Report on UK Patent Application No. GB0612108.1, mailed Mar. 5, 2007.
Examination Report for Chilean Patent Application No. 2361/2003, dated May 7, 2007.
Office Action for Canadian Patent Application No. 2,449,467, mailed Sep. 13, 2007.
Office Action for Canadian Patent Application No. 2,505,740, mailed Jun. 4, 2008.
Substantive Examination Report for ARIPO Patent Application No. AP/P/2005/003335, mailed Aug. 18, 2008.
Translation of Report Previous to Final Decision for Argentine Patent Application No. P030104232.
Examination Report and Form No. 21 for ARIPO Patent Application No. AP/P/2005/003335, mailed Jan. 29, 2009.
Office Action for Canadian Patent Application No. 2,449,467, mailed Jan. 28, 2009.
Office Action for Canadian Patent Application No. 2,505,740, mailed Jul. 16, 2009.
Notice of Allowance for Canadian Patent Application No. 2,449,467, mailed Sep. 14, 2009.
Office Action for U.S. Appl. No. 10/713,640 mailed Jul. 28, 2006.
Office Action for U.S. Appl. No. 10/713,640, mailed Dec. 31, 2007.
Office Action for U.S. Appl. No. 11/613,056 mailed Feb. 22, 2008.
Office Action for U.S. Appl. No. 11/613,056 mailed Aug. 22, 2008.
Office Action for U.S. Appl. No. 10/713,640, mailed Dec. 3, 2008.
Notice of Allowance for U.S. Appl. No. 11/613,056 mailed Feb. 10, 2009.
Office Action for U.S. Appl. No. 10/713,640 mailed May 27, 2009.
Notice of Allowance for U.S. Appl. No. 11/613,056 mailed Apr. 10, 2009.
Notice of Allowance for U.S. Appl. No. 10/713,640 mailed Dec. 23, 2009.
Notice of Allowance for Canadian Patent Application No. 2,505,740, dated Apr. 6, 2010.
Official Actio for Canada Patent Application No. 2,716,442, dated Jul. 5, 2011 4 pages.
Official Action for Canada Patent Application No. 2,691,607, dated Aug. 8, 2011, 3 pages.

* cited by examiner

US 8,097,227 B2

METHOD FOR THIOSULFATE LEACHING OF PRECIOUS METAL-CONTAINING MATERIALS

CROSS REFERENCE TO RELATED APPLICATION

The present application is a divisional of U.S. patent application Ser. No. 10/713,640, filed Nov. 13, 2003, which claims priority from U.S. Provisional Application Ser. No. 60/426,343, filed Nov. 15, 2002, each of which is incorporated herein by this reference.

FIELD OF THE INVENTION

The present invention is directed generally to the recovery of precious metals from precious metal-containing material and specifically to the recovery of precious metals from precious metal-containing material using thiosulfate lixiviants.

BACKGROUND OF THE INVENTION

A traditional technique for recovering precious metal(s) from precious metal-containing ore is by leaching the material with a cyanide lixiviant. As used herein, a "precious metal" refers to gold, silver, and the platinum group metals (e.g., platinum, palladium, ruthenium, rhodium, osmium, and iridium). Many countries are placing severe limitations on the use of cyanide due to the deleterious effects of cyanide on the environment. Incidents of fish and other wildlife having been killed by the leakage of cyanide into waterways have been reported. The limitations being placed on cyanide use have increased substantially the cost of extracting precious metal(s) from ore, thereby decreasing precious metal reserves in many countries. Cyanide is also unable to recover precious metals such as gold from refractory ores without a pretreatment step. "Refractory ores" refer to those ores that do not respond well to conventional cyanide leaching. Examples of refractory ores include sulfidic ores (where at least some of the precious metals are locked up in the sulfide matrix), carbonaceous ores (where the precious metal complex dissolved in the lixiviant adsorbs onto carbonaceous matter in the ores), and ores that are both sulfidic and carbonaceous.

Thiosulfate has been actively considered as a replacement for cyanide. Thiosulfate is relatively inexpensive and is far less harmful to the environment than cyanide. Thiosulfate has also been shown to be effective in recovering precious metals from pretreated refractory preg-robbing carbonaceous ores and sulfidic ores. As used herein, "preg-robbing" is any material that interacts with (e.g., adsorbs or binds) precious metals after dissolution by a lixiviant, thereby interfering with precious metal extraction, and "carbonaceous material" is any material that includes one or more carbon-containing compounds, such as, but not limited to, humic acid, graphite, bitumins and asphaltic compounds.

Where gold is the precious metal, thiosulfate leaching techniques have typically relied on the use of copper ions to catalyze and accelerate the oxidation of gold, ammonia to facilitate the formation and stabilization of cupric amine ions and/or a pH at pH 9 or above to maintain a region of stability where both the cupric amine and gold thiosulfate complexes are stable.

It is well known in the art that the catalytic effect of copper and ammonia in conventional thiosulfate leaching of gold is described by the following sequence of reactions.

Formation of the cupric amine complex:

$$Cu^{2+} + 4NH_3 \rightarrow Cu(NH_3)_4^{2+} \quad (1)$$

Oxidation of gold by cupric amine, gold complexation as the gold-thiosulfate anion, and reduction of cupric amine to cuprous thiosulfate:

$$Au + Cu(NH_3)_4^{2+} + 5S_2O_3^{2-} \rightarrow Au(S_2O_3)_2^{3-} + Cu(S_2O_3)_2^{5-} + 4NH_3 \quad (2)$$

Oxidation of the cuprous thiosulfate back to cupric amine with oxygen:

$$Cu(S_2O_3)_3^{5-} + 4NH_3 + \tfrac{1}{4}O_2 + \tfrac{1}{2}H_2O \rightarrow Cu(NH_3)_4^{2+} + 3S_2O_3^{2-} + OH^- \quad (3)$$

Summing equations (2) and (3) yields the overall thiosulfate leach reaction for gold:

$$Au + 2S_2O_3^{2-} + \tfrac{1}{4}O_2 + H_2O \rightarrow Au(S_2O_3)_2^{3-} + OH^- \quad (4)$$

It can be seen from the above equations that copper and ammonia act as catalysts in that they are neither produced nor consumed in the overall leach reaction.

Copper and ammonia can be a source of problems. Rapid oxidation of thiosulfate by cupric amine to form polythionates occurs, leading to excessive degradation and loss of thiosulfate:

$$2Cu(NH_3)_4^{2+} + 8S_2O_3^{2-} \rightarrow 2Cu(S_2O_3)_3^{5-} + S_4O_6^{2-} + 8NH_3 \quad (5)$$

Oxidative degradation of thiosulfates by molecular oxygen to polythionates and sulfates is accelerated markedly in the presence of copper ions and/or ammonia. Molecular oxygen conversion to thiosulfates is believed to occur according to sequence of reactions that involve the formation of intermediate polythionates (polythionates can be represented by $S_nO_6^{2-}$, where n=2-6):

Tetrathionate formation: $2S_2O_3^{2-} + \tfrac{1}{2}O_2 + H_2O \rightarrow S_4O_6^{2-} + 2OH^- \quad (6)$ Trithionate formation: $3S_4O_6^{2-} + \tfrac{5}{2}O_2 + H_2O \rightarrow 4S_3O_6^{2-} + 4H^+ \quad (7)$ Sulfite formation: $S_3O_6^{2-} + \tfrac{1}{2}O_2 + 2H_2O \rightarrow 3SO_3^{2-} + 4H^+ \quad (8)$ Sulfate formation: $2SO_3^{2-} + O_2 \rightarrow 2SO_4^{2-} \quad (9)$ Overall: $S_2O_3^{2-} + 2O_2 + H_2O \rightarrow 2SO_4^{2-} + 2H^+ \quad (10)$ Not only can the degradation of thiosulfate lead to increased reagent costs but also it has been discovered that excessive levels of sulfate can cause decreased gold recoveries. While not wishing to be bound by any theory, it is believed that excessive levels of sulfates can lead to unacceptable rates of thiosulfate degradation and levels of instability in the thiosulfate lixiviant. Additionally, ammonia gas can be released into the atmosphere when atmospheric leaching is performed. The loss of ammonia by volatilization occurs readily, particularly in unsealed gas-sparged reactors and heaps operating at pH greater than 9.2, leading to excessive ammonia consumption:

$$NH_4^+ + OH^- \rightarrow NH_{3(aq)} + H_2O \rightarrow NH_{3(g)} + H_2O \quad (11)$$

SUMMARY OF THE INVENTION

These and other needs have been addressed by the methodologies and systems of the present invention. The methodologies can recover precious metals, such as gold and silver, from a variety of materials, including refractory carbonaceous or sulfidic ores, double refractory ores (e.g., ores containing both sulfide-locked gold and carbonaceous preg-robbing matter); oxide ores, nonrefractory sulfidic ores, and ores also containing copper minerals and other materials derived from such ores (e.g., concentrates, tailings, etc.).

In one embodiment, a process for recovering a precious metal from a precious metal-containing material, includes the steps of:

(a) providing a heap of the precious metal-containing material; and (b) passing a thiosulfate lixiviant and molecular oxygen through the heap to form a pregnant leach solution comprising dissolved precious metals. As used herein, a "heap" refers to any self-supporting body of particulate material, including, without limitation, a particulate-containing heap, vat, and dump. The molecular oxygen is at a pressure greater than ambient atmospheric pressure before introduction into the heap. Preferably, the dissolved molecular oxygen content of the lixiviant ranges from about 1 to about 50 mg/L, and more preferably from about 3 to about 40 mg/L. Molecular oxygen can avoid the need for high levels of copper and ammonia in the lixiviant as catalysts without compromising precious metal recoveries. Preferably, the lixiviant comprises no more than about 20 mg/L dissolved copper.

The thiosulfate lixiviant can be derived from any suitable form(s) of thiosulfate, such as sodium thiosulfate, calcium thiosulfate, potassium thiosulfate and/or ammonium thiosulfate.

The precious metal can be recovered from the pregnant leach solution by any suitable technique. By way of example, the precious metal can be recovered by resin adsorption methods such as resin-in-pulp, resin-in-solution, and resin-in-leach or by solvent extraction, cementation, electrolysis, precipitation, and/or combinations of two or more of these techniques.

As will be appreciated, heap leaching can typically be performed at lower capital and operating costs than tank leaching and can yield similar precious metal recoveries. Recoveries of precious metals by both processes can be at least about 70% and sometimes at least about 80%, without the need for high levels of copper in the thiosulfate lixiviant. Surprisingly, when ammonium thiosulfate is used the presence of ammonium in the thiosulfate lixiviant does not necessarily cause the release of significant amounts of ammonia gas, notwithstanding the countercurrent circulation of a molecular oxygen-containing gas through the heap. This is so because the pH of the lixiviant is preferably maintained at a pH of no more than about pH 9. In this manner, the free ammonia content of the lixiviant can be maintained at no more than about 2,000 ppm.

Reducing or eliminating the need to have copper ions and/or ammonia present in the leach by effective use of molecular oxygen as the oxidant can provide significant multiple benefits. First, the cost of having to add copper and ammonia reagents to the process can be reduced significantly or eliminated. Second, environmental concerns relating to the presence of potentially harmful amounts of copper and ammonia in the tailings or other waste streams generated by the process can be mitigated. Third, the near-absence or complete absence of copper and ammonia in the leach can provide for a much more reliable and robust leaching process, yielding more stable leachates, able to operate over a wider pH and oxidation-reduction potential (ORP) range than is possible with conventional thiosulfate leaching. The latter process must operate in the relatively narrow window of pH and ORP where both the cupric amine complex and the gold thiosulfate complex co-exist. Finally, the near-absence or complete absence of copper and ammonia in the leach can reduce or eliminate entirely a host of deleterious side reactions that consume thiosulfate and are otherwise difficult or impossible to prevent.

Preferably, the thiosulfate lixiviant is at least substantially free of sulfite during the leaching step. The elimination or near elimination of sulfite from the thiosulfate leach can have advantages. Sulfite can depress the rate of dissolution of precious metal from the precious metal-containing material by reducing significantly the oxidation reduction potential (ORP) of the leach solution or lixiviant. As will be appreciated, the rate of oxidation of the gold (and therefore the rate of dissolution of the gold) is directly dependent on the ORP.

In yet another embodiment, a process for recovering a precious metal from a carbonaceous precious metal-containing material is provided that includes the steps of:

(a) contacting a thiosulfate lixiviant with a precious metal-containing material to form a pregnant leach solution, the pregnant leach solution comprising a dissolved precious metal, thiosulfate, polythionate, and sulfate; and (b) maintaining a dissolved sulfate concentration in the pregnant leach solution of no more than about 100 g/L.

Sulfates are commonly in the lixiviant due to the degradation of thiosulfate. The presence of sulfate has been found to decrease precious metal recoveries, which is believed to be due to the increased instability of thiosulfate in the presence of sulfate. Higher levels of sulfates are believed to cause a more rapid rate of degradation of thiosulfate into polythionates and, ultimately, sulfate. As will be appreciated, sulfate removal can be effected by numerous techniques, including precipitation, membrane filtration, solvent extraction, and ion exchange.

In a preferred process configuration, the dissolved sulfate is precipitated using calcium. The calcium is typically introduced into the lixiviant as calcium carbonate, calcium chloride, calcium nitrate, calcium oxide, calcium thiosulfate, calcium hydroxide, and mixtures thereof.

In yet another embodiment, the pregnant leach solution from a thiosulfate leaching step is contacted, after the leaching step, with a reagent to convert at least about 50% and typically at least most of polythionates (particularly trithionate and tetrathionate) into thiosulfate and elemental sulfur and precipitate dissolved precious metals (and dissolved transition metals) followed by conversion of the elemental sulfur into thiosulfate. The reagent or reductant can be any suitable reactant to convert polythionates into thiosulfate, with any sulfide, and/or polysulfide (i.e., a compound containing one or a mixture of polymeric ion(s) $S_x^{2-}$, where x=2-6, such as disulfide, trisulfide, tetrasulfide, pentasulfide and hexasulfide) being particularly preferred. A sulfite reagent can also be used for thiosulfate regeneration but is generally effective only in converting polythionates of the form $S_xO_6^{2-}$, where x=4 to 6, to thiosulfate.

The elemental sulfur is converted into thiosulfate by contacting the product of the sulfide precipitation step with a sulfite reagent. The sulfite reagent can be any form of sulfite, with a bisulfite being preferred. The conversion of the elemental sulfur into thiosulfate can lead to lower thiosulfate reagent costs compared to a process in which the elemental sulfur is discarded and can control effectively the form and amount of sulfur at differing locations in the process.

The sulfide, bisulfide, and/or polysulfide can be compounded with any cation, with Group IA and IIA elements of the Periodic Table, ammonium, and hydrogen being preferred.

In yet another embodiment, a process for recovering a precious metal from a carbonaceous precious metal-containing material is provided in which a carbonaceous precious metal-containing material is contacted with a thiosulfate-containing lixiviant. The lixiviant contains a blinding agent. While not wishing to be bound by any theory, it is believed that the precious metal thiosulfate complex may be unstable under certain conditions and that the precious metal can be stripped from the thiosulfate-containing solution by a number of substances commonly encountered in precious metal-containing materials. The substances or preg robbing materials typically absorb, adsorb or precipitate the precious metal. Such preg-robbing materials include carbonaceous materials, pyrite-containing materials, chacopyrite and iron oxides. Surprisingly and unexpectedly, blinding agents may be used in the thiosulfate lixiviant to prevent or inhibit preg robbing of the precious metal by the preg robbing material. The blinding agent itself absorbs or adsorbs (in preference to the precious metal) or otherwise neutralizes (such as by chemical reaction) the preg robbing sites on the material. The blinding agent preferably includes one or more of hydrocarbons, alcohols, esters, aldehydes, surfactants, lauryl sulfonates, phosphates, and metal salts.

DETAILED DESCRIPTION

The present invention provides an improved thiosulfate leaching process for the recovery of precious metals from precious metal-bearing material. The precious metal(s) can be associated with nonprecious metals, such as base metals, e.g., copper, nickel, and cobalt. The precious metal-bearing material includes ore, concentrates, tailings, recycled industrial matter, spoil, or waste and mixtures thereof. The invention is particularly effective for recovering precious metals, particularly gold, from refractory carbonaceous material.

Figure 1A:
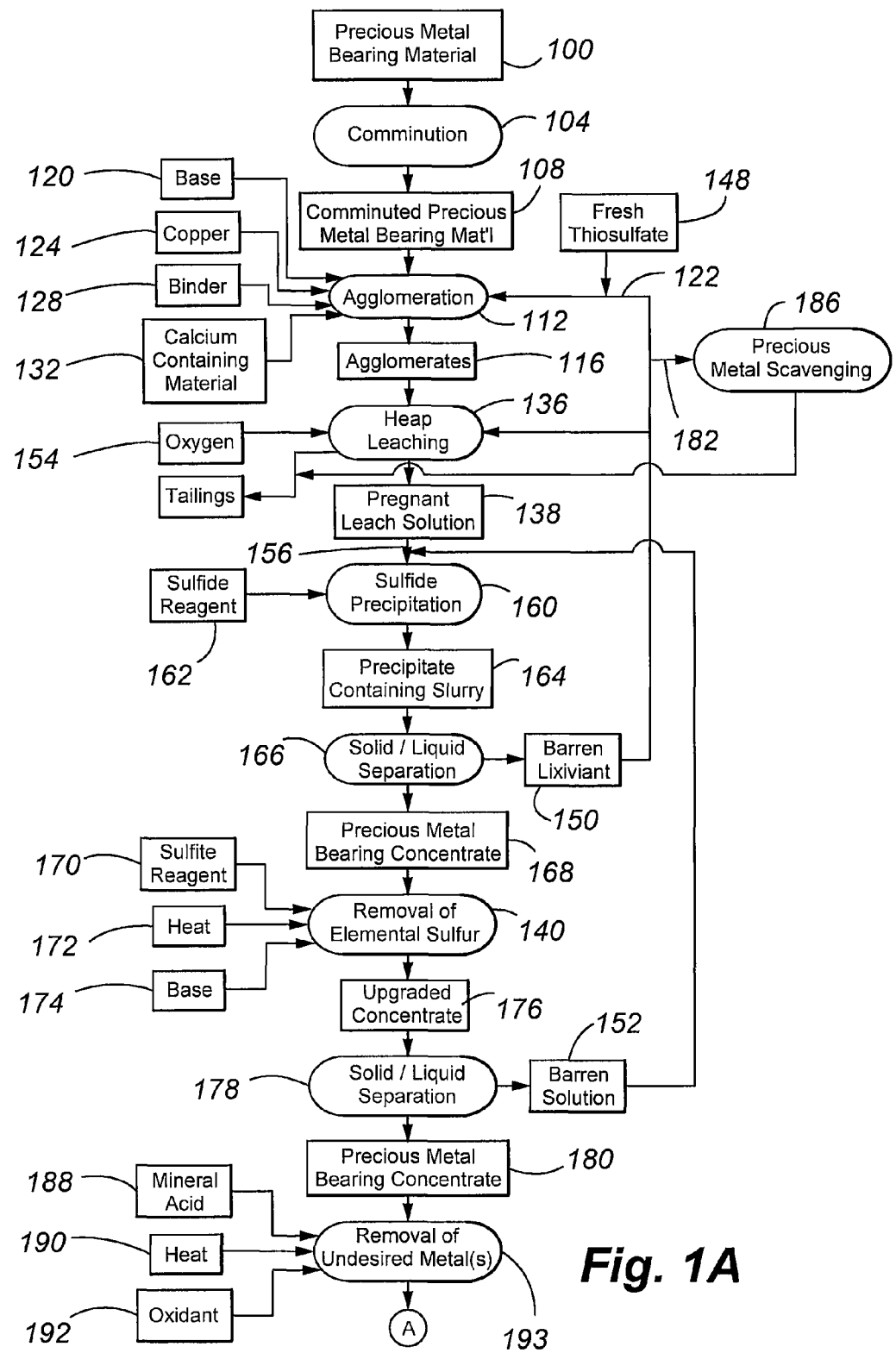
FIG. 1 is a flow schematic of a first embodiment of the present invention.

FIGS. 1A and B are collectively a flow chart according to a first embodiment of the present invention. The process of the flow chart is particularly effective in recovering gold from sulfidic and carbonaceous material and oxide material and mixtures thereof.

Referring to FIG. 1A, a precious metal-bearing material 100 is comminuted 104, such as by wet and/or dry crushing and optionally wet and/or dry grinding, to form a comminuted precious metal-bearing material 108. Comminution 104 typically reduces the particle size of the material 100 sufficiently to liberate the gold-bearing minerals. Typically, the comminuted precious metal-bearing material 108 is comminuted to a $P_{80}$ size of from about 2 inches to about ¼ inch.

To provide desired levels of heap porosity and permeability, the comminuted precious metal-bearing material 108 is agglomerated 112 by known techniques to form agglomerates 116. One or more of a base 120, the thiosulfate lixiviant 122, copper 124, a binder 128, and a calcium-containing material 132 may be contacted with the comminuted material 108 immediately before or during agglomeration 112 to assist in agglomerate formation and "jump start" the leaching process of step 136. In other words, the base 120, thiosulfate lixiviant 122, copper 124, and binder 128 are incorporated into the agglomerate matrix.

The base 120 can be any suitable base material effective to adjust the pH of the thiosulfate lixiviant to desired levels. Preferably, the pH of the thiosulfate lixiviant is no more than about pH 10, more preferably no more than about pH 9, and even more preferably ranges from about pH 8 to about 9. Preferred bases include alkali or alkaline earth metal oxides, carbonates, hydroxides, cement, ammonia, and mixtures thereof. To realize these operating pHs, the amount of base (lime) incorporated into the agglomerates of a typical ore ranges from about 0.1 to about 10 kg/tonne of comminuted precious metal-bearing material 108. The base 120 is typically introduced in powdered form to the comminuted precious metal-bearing material 108 during agglomeration 112.

The copper 124, which is optional, can be in any suitable form that is soluble in the thiosulfate lixiviant. Preferably, the copper 124, when added, is the form of a copper sulfate, copper oxide, copper nitrate, copper chloride, and mixtures thereof. Sufficient copper may be added to catalyze the leaching reaction when necessary to realize desired rates of precious metal recovery. When added, the preferred mass ratio of the copper ion to thiosulfate ion is preferably from about 1:10 to about 1:1000. Typically, the copper is added in the form of copper sulfate in an amount ranging from about 1 to about 100 g/tonne of comminuted precious metal-bearing material 108. Preferably, no copper is added but rather oxidation is effected by raising the lixiviant's dissolved molecular oxygen content above naturally occurring levels.

The binder 128, which is also optional, can be any suitable binder capable of producing robust agglomerates. Possible binders include a commercially available cohesivity agent such as NALCO 9704, cement, lime, and other long chain polymers, water, and mixtures thereof. The preferred binder 128 is a cohesivity agent, which along with the thiosulfate lixiviant 122, can provide highly robust agglomerates. The amount of binder 128 employed typically ranges from about 0.1 to about 10 kg/tonne of comminuted precious metal-bearing material 108. The binder 128 is typically added to the comminuted precious metal-bearing material as a free flowing particulate or a liquid before or during agglomeration.

The calcium-containing material 132 controls the concentration of sulfates in the various process solutions described below. The calcium-containing material 132 is in a form that is soluble in the thiosulfate lixiviant so as to provide calcium ions to react with sulfate ions to form and precipitate gypsum ($CaSO_4$). Because the gypsum precipitates in the heap removal of gypsum by filtration or other means is not required. Preferred calcium-containing materials include lime (CaO), calcium carbonates, calcium nitrates, calcium chlorides, calcium hydroxides, calcium thiosulfate, and mixtures thereof, with lime being particularly preferred. Lime is able to perform not only sulfate control but also pH control, thereby potentially rendering the base 120 unnecessary. The amount of calcium-containing material is preferably sufficient to maintain a maximum dissolved sulfate ion concentration in the pregnant leach solution 138 of about 150 g/L, more preferably of about 100 g/L, and even more preferably of about 50 g/L, and even more preferably of about 30 g/L. The amount of calcium-containing material therefore depends on the rate of degradation of the thiosulfate into sulfate between cycles of thiosulfate regeneration in steps 140 and 144 (discussed below). This can be quantified by measuring the current sulfate concentration at one or more selected points in the process and adding sufficient calcium to reduce the concentration to desired levels. Typically, the amount of calcium is at least about 0.1 kg, more typically at least about 1 kg, and even more typically ranges from about 0.1 to about 5 kg/tonne of comminuted precious metal-bearing material 108. The calcium-containing material 132 is typically added to the comminuted precious metal-bearing material 108 as a free flowing particulate material or slurry or liquid before or during agglomeration. As will be appreciated, the amount of calcium includes native or naturally occurring calcium already present in the material 108.

As will be appreciated, metals other than calcium may be used to effect sulfate precipitation. Examples of other metals include lead and barium. These other metals are generally not preferred for purposes of cost and environmental considerations.

In a preferred process configuration, the calcium-containing material 132 is a mixture of calcium compounds, with a mixture of lime and calcium carbonate being particularly preferred.

Finally, the thiosulfate lixiviant 122 is contacted with the comminuted precious metal-bearing material 108 before or during agglomeration 112. The thiosulfate lixiviant 122 is made by recharging the conditioned recycle solution 144 (discussed below) with fresh thiosulfate 148. As discussed below, the conditioned recycle solution 144 is the product of conditioning the recycled barren lixiviant 150. The optimum solution thiosulfate concentration to maintain during heap leaching 136 and therefore the optimum solution thiosulfate concentration in the thiosulfate lixiviant 122 will depend on the nature of the material being leached, but will preferably range from about 0.005 to about 2 molar (M), more preferably about 0.02 to about 0.5 M, and even more preferably from about 0.05 to about 0.2 M. The source of the fresh thiosulfate 148 can be any available thiosulfate-containing compound, such as sodium thiosulfate, potassium thiosulfate, calcium thiosulfate, ammonium thiosulfate, or any other thiosulfate-containing material or thiosulfate precursor. Alternatively, thiosulfate can be generated in situ or in a separate step by reaction of elemental sulfur with a source of hydroxyl ions, in accordance with the following reaction:

$$2(x+1)S + 6OH^- \rightarrow S_2O_3^{2-} + 2S_x^{2-} + 3H_2O \quad (12)$$

where x=3-6, or by reaction of bisulfide with bisulfite:

$$2HS^- + 4HSO_3^- \rightarrow 3S_2O_3^{2-} + 3H_2O \quad (13)$$

or by reaction of elemental sulfur with sulfite:

$$S + SO_3^{2-} \rightarrow S_2O_3^{2-} \quad (14)$$

As will be appreciated, to produce a structured agglomerate cement (not shown) may be added during agglomeration. The cement is added in particulate form before or during agglomeration and is thereby incorporated into the agglomerate. When used, the amount of cement typically ranges from about 1 to about 50 kg/tonne of comminuted precious metal-bearing material 108.

The size of the agglomerates 116 depends, of course, on the heap design. Typically, it is preferred that the $P_{80}$ size of the particles/agglomerates formed into the heap is at least about 150 μm, more preferably at least about 500 μm, and even more preferably at least about 1,000 μm.

As an alternative to agglomeration, it is possible to provide desired levels of heap porosity and permeability by comminuting the precious metal-containing material to a desired size range. In that event, the base 120, copper 124, and calcium conditioning material 132 is incorporated into the heap during heap construction (or stacking). In other words, these materials may be contacted with the comminuted precious metal-bearing material 108 on the stacking conveyor belts or in the haulage compartment of a haulage vehicle which will dump the material 108 onto the heap pad. The various materials may be located uniformly throughout the heap or in a zone of the heap, such as at the bottom, middle or top. When agglomeration is not performed, the comminuted material 108 has a preferred $P_{80}$ size of at least about 150 μm, more preferably at least about 500 μm, and even more preferably at least about 1,000 μm. This size range is realized by removing fine particles (particles preferably having a size of less than about 150 μm and more preferably of less than about 500 μm) from the comminuted material 108, by suitable screens, filters, and the like, prior to material placement on the leach pad. Thiosulfate lixiviant can be contacted with the particles of material as the particles are being placed on the heap.

In step 136, the agglomerates 116 are leached to form a pregnant leach solution 138 containing dissolved precious metals solubilized from the precious metal-bearing material 108. The extraction of precious metals in the leaching step 136 is relatively high, particularly for carbonaceous ores. Typically, at least about 50%, more typically at least about 70%, and even more typically at least about 80% of the precious metal in the precious metal-containing material 108 is extracted or solubilized into the pregnant solution 138. The concentration of the dissolved precious metal in the pregnant solution 138 typically ranges from about 0.05 to about 100 ppm and more typically from about 0.1 to about 20 ppm.

Before leaching can commence, the heap must be formed on a leach pad. The pad typically includes a liquid impervious liner, which is placed beneath the heap, to collect the pregnant leach solution 138 and prevent the pregnant leach solution 138 from being lost to the surrounding environment. The height of each lift of the heap is typically from about 4 to about 8 m and of the heap itself can be up to 100 m. Rather than moving the heap after thiosulfate leaching is completed (which is done in a dynamic heap configuration), further heaps or lifts can be built on top of exhausted heap(s) (which is done in a static heap configuration).

During heap construction, a network of aerating pipes can be located in a lower portion of the heap to force an oxygen-containing gas 154 through the heap during thiosulfate leaching. The pipes can be perforated so as to provide a substantially uniform dispersion of the gas throughout the heap. The oxygen-containing gas 154 is typically forced through the pipes using a single- or multi-stage compressor, blower, fan, or other mechanical device. When the oxygen-containing gas 154 is pressurized and forced through the pipes, it typically has a pressure greater than the ambient atmospheric pressure, more typically of at least about 1 inch $H_2O$, and even more typically of at least about 30 inches $H_2O$ greater than the ambient atmospheric pressure. Preferably, at least a stoichiometric amount of molecular oxygen (relative to the amount of precious metal in the precious metal-containing material) is deliberately introduced into the heap during leaching 136. More preferably, at least about 0.5 kg of molecular oxygen and even more preferably from about 1 to about 10 kg of molecular oxygen is introduced into the heap during leaching for each ton of material to be leached in the heap. Preferably, at least about 2 and more preferably from about 4 to about 40 m³ of oxygen-containing gas is introduced into the heap for each cubic meter of lixiviant applied to the heap.

Using gold as an example, the thiosulfate leaching of precious metal-bearing material in the presence of molecular oxygen can be illustrated by the following reaction:

$$Au + 2S_2O_3^{2-} + \tfrac{1}{4}O_2 + \tfrac{1}{2}H_2O \rightarrow Au(S_2O_3)_2^{3-} + OH^- \quad (15)$$

The oxygen-containing gas may include atmospheric air, or it may include relatively pure (95%+) oxygen such as that produced from any commercially available oxygen plant, or it may include any other available source of oxygen.

To control evolution of ammonia gas during forced air introduction into the heap, the pH of the thiosulfate lixiviant 122 and recirculated pregnant leach solution 138 are controlled. Preferably, the pH of the thiosulfate lixiviant and solution 138 are maintained (when introduced into the heap and during passage through the heap) at a pH of no more than about pH 9, more preferably of no more than about pH 8.75, and even more preferably of from about pH 6.5 to about pH 8.75. Alternatively, the concentration of free ammonia can be maintained below levels sufficient to result in evolution of significant amounts of ammonia gas. In some configurations, the concentration of free ammonia in the thiosulfate lixiviant applied to the top of the heap is maintained at a level of no more than about 2000 ppm, more preferably no more than about 1000 ppm, and even more preferably no more than about 500 ppm. This can be realized, for example, by using sodium thiosulfate alone as the lixiviant or using a mixture of ammonium and sodium thiosulfate.

The pH can be controlled by using suitable (acid or base) buffering agents to produce the desired change in pH. In one configuration, carbonaceous compounds, such as calcium carbonates, (in addition to the base 120 incorporated in the agglomerates 116) are added to the lixiviant 122 and solution 138 before or after application to the heap and/or to the heap itself. The carbon component in the buffering agent has been found under suitable conditions to perform, at most, only a minimal degree of preg robbing. Typical consumption of carbonates in this configuration is in the range of about 0.5 to about 10 lb/ton of material in the heap.

To apply the thiosulfate lixiviant to the heap, a number of techniques can be employed. For example, spray systems (such as spray nozzles), drip and/or trickle systems (such as drip emitters and perforated pipes), injection holes in the heap, and irrigation ditches on top of the heap can be used to apply the lixiviant. The preferred lixiviant distribution system preferably applies the lixiviant at least substantially uniformly throughout the heap. In a preferred configuration, the applied lixiviant flows countercurrently through the heap relative to the flow of the oxygen-containing gas. Typically, the lixiviant flows from the top to the bottom of the heap while the gas flows from the bottom to the top of the heap. In a preferred configuration, at least about 0.5 and even more preferably from about 1 to about 10t solution/t ore of lixiviant is applied to the top of the heap from start-to-finish of heap leaching. In this configuration the lixiviant is applied for at least about 0.5 and even more preferably from about 1 to 48 months from the start to finish of heal leaching.

In one configuration, the lixiviant is sparged with the oxygen-containing gas before application to the heap or the gas is otherwise contacted with the lixiviant before application to the heap (such as by in-line mixing) to cause the lixiviant to have a heightened dissolved molecular oxygen content. Additional gas may be deliberately introduced into the heap separately from the lixiviant, if desired. The dissolved molecular oxygen content of the lixiviant preferably is at least about 1 mg/L, more preferably is at least about 3 mg/L, even more preferably ranges from about 3 to about 40 mg/L, and even more preferably ranges from about 3 to about 15 mg/L.

In one configuration, the dissolved molecular oxygen content is realized by adding chemicals, such as a peroxide, that break down to generate molecular oxygen in the heap.

After construction of the heap, the thiosulfate lixiviant 122 is applied to the top of the heap while the oxygen-containing gas is introduced to the bottom of the heap. The pregnant leach solution 138 is collected from the base of the heap. A portion of the pregnant leach solution 138 is recycled to the top of the heap. The recycle rate is sufficient to provide an application rate of the lixiviant to the top of the heap of from about 0.5 and more preferably from about 2 to about 24 L/h/m² of top surface area for the heap. During recycle, at least a portion 156 (typically at least about 5 vol. % and more typically from about 50 to about 100 vol. %) of the pregnant leach solution 138 is removed and subjected to further processing to effect precious metal recovery. At least most of the precious metal in the material 108 is solubilized by the lixiviant and, therefore, dissolved in the pregnant leach solution 138.

The first processing step 160 is sulfide precipitation of the dissolved precious metals using a sulfide reagent 162 to form a precipitate-containing slurry 164. Sulfide precipitation not only precipitates the precious metal but also precipitates transition metals, such as copper, and regenerates the thiosulfate by converting polythionates into thiosulfate. By way of example, a sulfide-containing reagent can reduce the polythionates back to thiosulfate, as shown by the following reactions:

$$2S_4O_6^{2-} + S^{2-} + 3/2 H_2O \rightarrow 9/2 S_2O_3^{2-} + 3H^+ \tag{16}$$

$$S_3O_6^{2-} + S^{2-} \rightarrow 2S_2O_3^{2-} \tag{17}$$

Any sulfide reagent that releases sulfide ions on dissolution will suffice, such as a sulfide, bisulfide, or polysulfide. Examples of preferred reagents include ammonium sulfide, sodium bisulfide, NaHS, sodium sulfide, Na₂S, or hydrogen sulfide gas, H₂S.

Sulfide precipitation 160 is typically conducted under anaerobic or oxygen-depleted conditions, as noted above. Such conditions can be realized and maintained by de-aerating the pregnant leach solution 138 with a vacuum, inert or oxygen-deficient gas bubbling or sparging through the solution 138, maintaining a blanket of a noble gas in the atmosphere over the solution 138, and/or allowing the solution 138 to stand dormant for a sufficient period of time for the dissolved oxygen level to decrease to desired levels. Preferably, the solution 138 contains no more than about 1 ppm dissolved molecular oxygen and more preferably less than about 0.2 ppm dissolved molecular oxygen concentration.

In one process configuration, the oxygen-depleted atmosphere is inert. As used herein, "inert" refers to any gas which is at least substantially free of oxidants, such as molecular oxygen, that can cause thio sulfate to be converted into a polythionate. For example, an "inert" gas would include a reducing gas. Typically, the inert atmosphere will include at least about 85 vol % of an inert gas, preferably nitrogen gas, and no more than about 5 vol % oxidants, such as oxygen gas, that can cause thiosulfate conversion into a polythionate. The molecular nitrogen can be a byproduct of the oxygen plant that is employed in the leaching step to provide oxygen gas.

While not wishing to be bound by any theory, it is believed that sparging is more effective than an inert atmosphere without sparging in controlling polythionate and sulfate production. Sparging appears to inhibit molecular oxygen ingress into the solution, even where the reactor is open to the ambient atmosphere, because of the outflow of inert gas from the surface of the solution.

Preferably, sufficient sulfide is added to the pregnant leach solution 138 to precipitate at least most of the dissolved precious and transition metal(s) as sulfides and to convert at least most of the polythionates to thiosulfate, more preferably to precipitate at least about 99% of the precious and transition metals and convert at least about 90% of the polythionates to thiosulfate, effectively regenerating the thiosulfate lixiviant. Typically, the amount of sulfide reagent contacted with the solution 138 is at least about 100 to about 150% of the stoichiometric amount required to convert at least substantially all of the polythionates in the solution 138 into thiosulfates. This amount is generally sufficient to precipitate at least most of the precious and transition metals. Typically, at least about 50%, more typically at least most, and even more typically from about 80 to about 95% of the polythionates are converted into thiosulfates in step 160.

While not wishing to be bound by any theory, it is believed that the most likely composition of the precipitate is the metallic precious metal and/or a precious metal sulfide, such as $Au_2S$. Maximum precipitation of gold and regeneration of thiosulfate is accomplished by adding at least a stoichiometric amount of sulfide reagent 162 (relative to the dissolved precious metal and polythionate concentrations) to reduce the solution ORP to at least about 50 mV (SHE). The effectiveness of the conversion causes significantly less thiosulfate reagent to be consumed during the process than for conventional thiosulfate leaching processes.

The pH of the pregnant leach solution 138 is adjusted if necessary to about pH 5.5-12, more preferably about pH 7-11, even more preferably about pH 8-10 using a suitable basic reagent such as sodium hydroxide before or during contact of the solution with the sulfide reagent 162. The temperature of the solution 162 is preferably maintained in the range of about 5 to 40° C., and more preferably at ambient temperature, about 20° C. The retention time is about 5 minutes to about 2 hours, more preferably about 15 minutes to about 1 hour.

The precious metal precipitation step 160 can be carried out in any suitably agitated reactor or plurality of agitated reactors.

The precipitate-containing slurry 164 is subjected to liquid/solid separation 166 to separate the precious metal-bearing precipitates or concentrate 168 containing at least most of the precious metal(s) in the slurry 164 from the barren lixiviant 150 containing at least most of the thiosulfate in the slurry 164. The solid/liquid separation can be effected by any suitable method such as filtration, counter current decantation ("CCD"), and the like. As will be appreciated, CCD performs liquid/solid separation, provides water balancing in the circuit, and prevents build up of impurities in the leach circuit by removing a portion of the leach solution with the solids.

The barren thiosulfate lixiviant 150 can be recombined with the recycled pregnant leach solution and returned to the top of the heap. The barren lixiviant 150 will typically contain no more than about 0.01 ppm precious metals or 1% of the precious metal(s) in the pregnant leach solution 138.

The concentrate 168, which is typically in the form of a sludge or slurry, contains a substantial amount of elemental sulfur along with various precious metal sulfides and non-precious metal sulfides (such as copper sulfides, mercury sulfides, and nickel sulfides). The elemental sulfur concentration in the concentrate is typically at least about 50 wt. % and more typically from about 55 wt. % to about 99.9 wt. %. The concentrate 168 typically further include from about 0.01 to about 10 wt. % precious metal sulfides and from about 0.01 to about 10 wt. % non-precious metal sulfides.

The elemental sulfur is removed from the precious metal-bearing concentrate 168 in step 140, and the precious metal concentration of the concentrate 168 significantly upgraded. This is performed by contacting the concentrate 168 with a source of sulfite under at least substantially non-oxidizing conditions (or in the presence of an inert gas atmosphere) to convert the elemental sulfur into thiosulfate. As shown in the Figure, the concentrate 168 is contacted with a sulfite reagent 170, heat 172, and a base 174 in a suitable reactor.

The sulfite reagent 170 can be any sulfite-containing compound, such as ammonium bisulfite, sodium sulfite, sodium bisulfite, and potassium bisulfite, with a bisulfite such as ammonium bisulfite being preferred. For ammonium bisulfite, the chemical reaction is believed to proceed in accordance with equation 14 above.

The amount of sulfite reagent 170 used in step 140 depends on the elemental sulfur content of the concentrate 168. Typically, the amount of sulfite reagent is at least the stoichiometric amount, and more typically at least about 120% of the stoichiometric amount, required to convert the present elemental sulfur to thiosulfate. For ammonium bisulfite as the sulfite reagent 170, the amount of reagent used is typically at least about 2 kg reagent/kg of present elemental sulfur and more typically ranges from about 3 to about 5 kg reagent/kg of present elemental sulfur.

For the reaction to proceed to completion, the pH of the concentrate 168 is carefully controlled. The preferred pH is at least about pH 6, more preferably at least about pH 7, and even more preferably ranges from about pH 7.5 to about pH 10. Because bisulfite will produce an acidic pH when reacted with elemental sulfur, it is important to contact the base 174 with the concentrate 168. The base 174 can be any basic compound, such as carbonates, oxides, hydroxides, ammonia gas, with ammonia gas and/or sodium carbonate being preferred for reasons of cost.

The temperature of the concentrate 168 during step 140 is preferably at least about 70° C., and more preferably ranges from about 90 to about 100° C.

The residence time of the concentrate 168 in the reactor is preferably at least about 1 minute and more preferably ranges from about 10 to about 20 minutes.

The reactor can be configured as a batch or continuous reactor and as a single- or multi-compartment vessel. Preferably, the reactor has from one to six compartments. The reactor typically agitates the various components for better reaction kinetics.

The atmosphere of the reactor is preferably anaerobic to limit the oxidation of sulfite and ensure that the precious metal precipitates in the concentrate 168 are not dissolved. The atmosphere can be realized and maintained by de-aerating the concentrate 168 with a vacuum, inert or oxygen-deficient gas bubbling or sparging through the concentrate 168, maintaining a blanket of nitrogen in the atmosphere over the concentrate 168, and/or allowing the concentrate 168 to stand dormant for a sufficient period of time for the dissolved oxygen level to decrease to desired levels. Preferably, the concentrate 168 contains no more than about 1 ppm dissolved molecular oxygen and more preferably less than about 0.2 ppm dissolved molecular oxygen concentration.

The upgraded concentrate 176 outputted by step 140 comprises the precious and non-precious precious metal precipitates, thiosulfate, elemental sulfur, and sulfite reagent. The upgraded concentrate 176 is a slurry having a liquid component that contains predominantly thiosulfate and a solid component that contains predominantly the precious and non-precious metal precipitates. Typically, at least about 50% and more typically at least about 90% of the elemental sulfur is converted into thiosulfate. The concentration of the precious metal precipitates in the upgraded concentrate 176 typically ranges from about 0.1 to about 75 wt. % of the upgraded concentrate 176 and the concentration of the elemental sulfur from about 0.1 to about 50 wt. % of the upgraded concentrate 176.

In step 178, the upgraded concentrate 176 is subjected to further liquid/solid separation by any of the techniques noted above to produce precious metal-bearing solids 180 containing at least most of the precious metal content and a barren solution 152 containing at least most of the thiosulfate of the upgraded concentrate 176. The preferred separation technique is settling and filtration.

Due to the removal of elemental sulfur, the precious metal concentration in the precious metal-bearing solids 180 is substantially higher than that in the upgraded concentrate 176. Typically, the precious metal concentration in the solids 180 is from about 500 to 20,000% of the precious metal concentration in the upgraded concentrate 176.

The barren solution 152 is recycled to the sulfide precipitation step 160.

A minor portion (e.g., from about 2 to about 20 vol %) of the barren lixiviant 150 or bleed stream 182 may have to be bled to tailings to control the buildup of impurities, such as soluble sulfate and metallic impurities. Prior to discharge to tailings the bleed stream 182 of the lixiviant 150 is directed to the precious metal scavenging step 186 to recover any precious metals remaining in solution that were not recovered previously. Precious metal scavenging can be accomplished, by any suitable gold recovery technique such as by passing the bleed solution 182 through a column containing a strong base resin to adsorb the precious metal. While not wishing to be bound by any theory, precipitated precious metal can be redissolved due to a trace amount of molecular oxygen in the solution and incomplete reduction of polythionates in the solution. Because the amount of polythionates in the bleed is negligible, a resin-in-column recovery technique will have an excellent ability to load any remaining dissolved precious metal.

Turning now to the further treatment of the precious metal-bearing solids 180, the solids 180 are contacted in step 193 with a mineral acid 188, heat 190, and an oxidant 192 to remove any undesired non-precious metal(s) and form a precious metal-containing slurry 194. Examples of such undesired non-precious metal(s) include mercury in the form of mercuric sulfide, copper in the form of copper sulfide, and other transition metal sulfides. The mineral acid and/or oxidant solubilize at least most of the mercury or base metal(s) in the liquid phase and leave at least most of the precious metals in the solid phase.

The mineral acid 188 can be any suitable acid, including nitric acid, hydrochloric acid, (hydro) sulfuric acid, and mixtures thereof, with nitric acid being preferred. The preferred acid concentration is from about 1 to about 50 wt. %.

The oxidant 192 can be any suitable material, such as oxygen, nitric acid, peroxides, and mixtures thereof, with nitric acid being preferred. The preferred oxidant concentration ranges from about 1 to about 50 wt. %.

The preferred temperature of the solids during step 193 is greater than about 5° C. and more preferably ranges from about 90 to about 100_C.

The residence time of the solids 180 in step 193 preferably ranges from about 10 to about 480 minutes.

The precious metal-containing slurry 194 is subjected to liquid/solid separation 195 by any of the techniques noted above to form a barren liquid 197 and precious metal bearing solids 196. At least about 10% of the non-precious metals originally in the pregnant leach solution 160 are contained in the barren liquid 197, and at least about 50% of the precious metals originally in the solution 160 are in the precious metal-bearing solids 196. The barren liquid 197 may be treated by known techniques to recover desired non-precious or base metals and/or discarded.

The precious metal-bearing solids 196 are subjected to refining 198 by known techniques to produce a precious metal product 199 of high purity.

Figure 2A:
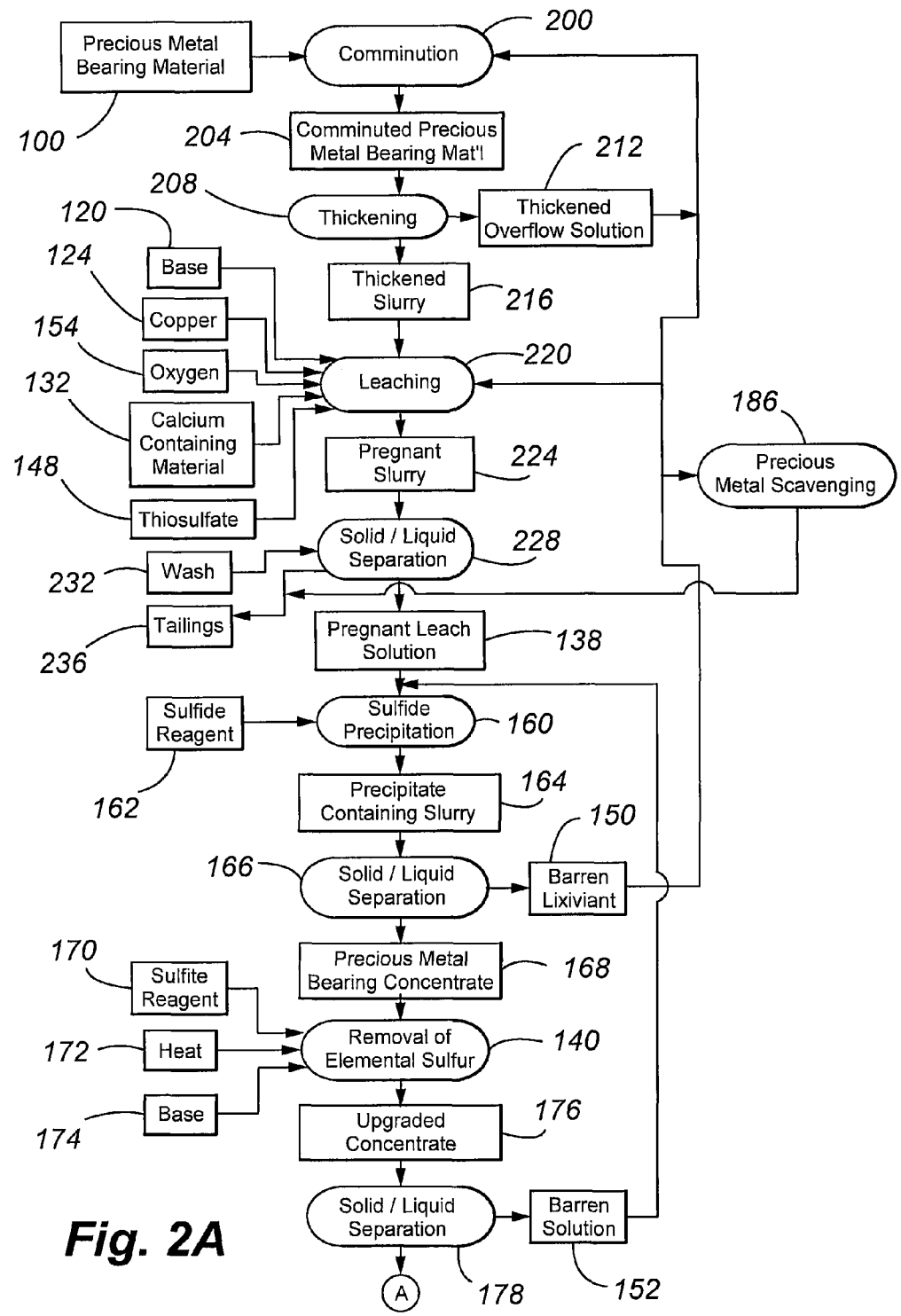
FIG. 2 is a flow schematic of second embodiment of the present invention.

A second embodiment of the present invention will now be discussed with reference to FIGS. 2A and B. The embodiment employs tank leaching rather than heap leaching to recover precious metals. Like-numbered elements in FIGS. 2A and B on the one hand and FIGS. 1A and B on the other are the same. Different numbered elements are discussed below.

The precious metal-bearing material 100 is comminuted in step 200 to produce a comminuted precious metal-bearing material 204. The material 204 is comminuted to a size sufficient to enable the solids to be suspended in an agitated vessel and to allow for the efficient leaching of the precious metals. Preferably, wet grinding is employed with the recycled thiosulfate leach solution 144 and water being used as the liquid component in the slurry. In that event, the slurried material 204 typically contains from about 0.05 to about 0.2 M thiosulfates and from about 0.0005 to about 0.025 m polythionates. The fully comminuted material particle size is preferably at least smaller than 80% passing about 48 mesh (300 microns), more preferably 80% passing about 100 mesh (150 microns), and most preferably 80% passing about 200 mesh (75 microns). The typical solids content of the slurred material 204 ranges from about 20 to about 30 wt. %. As will be appreciated, other techniques can be used to comminute the material to the desired particle size(s). By way of illustration, blasting can be used alone with or without crushing and grinding and crushing and grinding can be used alone with or without another comminution technique.

The slurried comminuted precious metal-bearing material 204 is then thickened 208 to adjust the pulp density to a value suitable for leaching. The ideal leach pulp density will vary according to the type of material being leached. Typically, the pulp density ranges from about 20 to about 50% solids by weight, but could be as low as about 1% or as high as about 60%. Thickening 208 will generally not be required if the desired pulp density (after wet comminution or formation of the comminuted material into a slurry) is less than about 20%.

The thickener overflow solution 212 is recycled back to the comminution step 200 in the event that wet grinding is employed. Otherwise, the overflow solution 212 is returned to the optional slurry formation step (not shown).

Fresh makeup thiosulfate is added, as necessary, at any suitable location(s), such as to the slurried material 204 during comminution 200 and/or in the thickener 208, to the thickened slurry 216 or overflow solution 212, to leaching 220 and/or to the recycle solution 144.

The thickened slurry 216 is subjected to leaching 220 in the presence of oxygen and thiosulfate. In one process configuration, leaching is conducted in the presence of an oxygen-enriched atmosphere at atmospheric pressure, or at a pressure above atmospheric pressure using an oxygen-containing gas to reduce or eliminate the need for the presence of copper and/or ammonia in the leach. The increased oxygen partial pressure in the leaching step 220 increases the rate of the reaction in Equation 15 in the absence or near absence of copper and ammonia. To accomplish this goal, the oxygen-containing gas may include atmospheric air, or it may include relatively pure (95%+) oxygen such as that produced from any commercially available oxygen plant, or it may include any other available source of oxygen. The desired oxygen partial pressure ($PO_2$) maintained during leaching will depend on the material being leached, but it will be at least higher than that provided under normal ambient conditions by air at the elevation the process is applied. Thus, if the process is practiced at sea level for example the oxygen partial pressure will be in excess of about 3 pounds per square inch absolute pressure (psia) to as high as about 500 psia, preferably from about 10 to about 115 psia, and most preferably from about 15 to about 65 psia. The total operating pressure is the sum of the molecular oxygen partial pressure and the water vapor pressure at the temperature employed in the leaching step 132, or preferably ranges from about 15 to about 600 psia and more preferably from about 15 to about 130 psia.

The leaching temperature will be dictated by the type of material being leached. The temperature will vary typically from about 5° C. to about 150° C., preferably from about 20 to about 100° C., and most preferably from about 40 to about 80° C. Higher temperatures accelerate the leaching of precious metals but also accelerate the degradation of thiosulfate. If required, a source of makeup heat such as steam is added to the leach reactors to maintain the desired temperature.

The leaching retention time is dependent on the material being leached and the temperature, and will range from about 1 hour to 96 hours, preferably from about 2 to about 16 hours, and most preferably from about 4 to about 8 hours.

In one process configuration, the absence or substantial absence of copper and/or ammonia in the leach greatly simplifies the process. Elimination or near-elimination of ammonia and copper from the leach provides the advantage of allowing for a consistently high and reproducible precious metal extraction over a broader pH range than was previously possible with the other thiosulfate leaching processes. Preferably, the (added and/or total solution) copper concentration is no more than about 20 ppm, more preferably no more than about 15 ppm, and even more preferably no more than about 10 ppm while the (added and/or total solution) ammonia concentration is no more than about 0.05 M, more preferably no more than about 0.03 M, and even more preferably no more than about 0.01 M. In this process configuration, leaching can be operated at about pH 7-12, preferably about pH 8-11, more preferably about pH 8-10, and even more preferably at a pH less than pH 9. The oxidation-reduction potential (ORP) preferably ranges from about 100 to about 350 mV and more preferably from about 150 to about 300 mV (vs. the standard hydrogen electrode (SHE)).

The leaching step 220 may be conducted in a batch or continuous basis but continuous operation is preferred. Continuous leaching is carried out in a multiple series of one or more reactors that are agitated sufficiently to maintain the solids in suspension. Agitation may be accomplished by mechanical, pneumatic or other means. In a preferred configuration, gassing impellers are employed, such as those disclosed in U.S. Pat. No. 6,183,706 and copending U.S. patent application Ser. No. 09/561,256, filed Apr. 27, 2000, which are incorporated herein by reference. Such impellers can significantly enhance the amount of dissolved molecular oxygen in the leach solution. Leaching may also be carried out in a multi-compartment autoclave containing one or more compartments, (with 4 to 6 compartments being preferred) similar in design to the autoclaves used to pressure oxidize sulfide-bearing ores or concentrates. However, owing to the non-acidic, moderate temperature, relatively mild conditions employed in the present invention, the autoclave materials of construction are much less expensive than those found to be necessary when oxidizing sulfide minerals. The latter autoclaves are normally constructed of a steel shell fitted with a lead liner and refractory brick liner and containing metallic components constructed of titanium or other expensive corrosion-resistant alloys. The leach reactors and contained metallic components employed by the present invention can be simply constructed of stainless steel and do not require lead or brick liners.

The pregnant slurry 224 is subjected to solid/liquid separation 228 by any of the techniques set forth above, with the solid fraction forming tailings 236 and the liquid fraction forming the pregnant leach solution 138.

The remaining steps are as described with reference to the corresponding numbered step in FIGS. 1A and B.

In any of the above processes or in other processes using thiosulfate as a lixiviant, the use of a blinding agent may improve metal recoveries. While not wishing to be bound by any theory, it is believed that the precious metal thiosulfate complex may be unstable under certain conditions, including those set forth above, and that the precious metal can be stripped from the thiosulfate-containing solution by a number of substances commonly encountered in precious metal-containing materials. The substances or preg robbing materials typically absorb, adsorb or precipitate the precious metal. Such preg-robbing materials include carbonaceous materials, pyrite-containing materials, chacopyrite and iron oxides. Surprisingly and unexpectedly, blinding agents may be used in the thiosulfate lixiviant to prevent or inhibit preg robbing of the precious metal by the preg robbing material. The blinding agent itself absorbs or adsorbs (in preference to the precious metal) or otherwise neutralizes (such as by chemical reaction) the preg robbing sites on the material. Suitable blinding agents include one or more of hydrocarbon-containing substances, such as aliphatic or cyclic hydrocarbons, preferably petroleum products (e.g., kerosene, diesel fuel, and gasoline), alcohols, esters, or aldehydes; surfactants such as detergents, sodium lauryl sulfonate, or organic phosphates; guar gum; starch, a cellulose such as a carboxy methyl cellulose; and reactive metal salts such as lead, mercury, cadmium, tin, and silver salts. In such situations, the thiosulfate lixiviant 144 and 148, in any of the leaching processes discussed above, typically includes at least about 0.1 mg/L, more typically at least about 1 mg/L, and even more typically from about 2 to about 200 mg/L of the blinding agent.

While not wishing to be bound by any theory, other agents may also be suitable as blinding agents. Preferably, the agents do not destabilize thiosulfate in solution. Agents which act as oxidation catalysts, can destabilize thiosulfate in solution. By way of example, copper salts under certain conditions are not preferred as a blinding agent as copper salts under these conditions can catalyze thiosulfate decomposition.

To facilitate extraction of gold from sulfidic and/or carbonaceous materials, the thiosulfate leach step in any of the above processes can be preceded by one or more pretreatment steps to destroy or neutralize the carbon-containing and/or sulfidic minerals. By way of example, the intermediate steps can include one or more of biooxidation or chemical oxidation to oxidize sulfides, ultrafine grinding to liberate occluded precious metals, conventional roasting to destroy carbon- and/or sulfide-containing minerals, and/or microwave roasting.

EXPERIMENTAL

A sulfur sludge contained 0.02 to 0.7 wt % gold and greater than 85% elemental sulfur. To replicate step 140 of FIG. 1A, the sludge was treated with sodium sulfite or ammonium bisulfite. To maintain the pH levels identified in the examples, a base was sometimes added.

In the examples below, "sludge" refers to the solid material (or the precious metal-bearing concentrate 168) produced by adding sulfide to the pregnant thiosulfate leach liquor, and "residue" refers to the solid product (or precious metal-bearing solids 180) from step 140.

Example 1

The gold grade increased from 0.6 wt % in the sludge to 25 wt % in the residue when using as low as 25% excess sodium sulfite ($Na_2SO_3$) (as defined by the excess of reagent applied above the stoichiometric requirement for 100% conversion of the elemental sulfur content of the sludge) at 100° C. for 70 to 120 minutes. The gold grade of the residue was 42 times larger than the gold grade of the sludge. As low as 8% of the original gold content of the sludge redissolved. Greater than 99% of the sulfur content of the sludge was converted primarily to thiosulfate. The sulfur content decreased from 87 wt % in the sludge to 16 wt % in the residue. The pH of the thiosulfate-rich solution remained above pH 9 without the need to add a base.

Example 2

The gold grade increased from 0.02 wt % in the sludge to 1.8 wt % in the residue when using as low as 31% excess ammonium bisulfite ($NH_4HSO_3$) at 100° C. for 22 minutes. The gold grade of the residue was 90 times larger than the gold grade of the sludge. The pH of the thiosulfate-rich solution was maintained in the range between pH 9.5 to pH 10 by using ammonia gas as a base. Greater than 99% of the sulfur content of the sludge was converted primarily to thiosulfate. The sulfur content decreased from 95 wt % in the sludge to 60 wt % in the residue.

Example 3

The gold grade increased from 0.6 wt % in the sludge to 25.6 wt % in the residue when using as low as 36% excess ammonium bisulfite ($NH_4HSO_3$) at 100° C. for 60 minutes. The gold grade of the residue was 44 times larger than the gold grade of the sludge. Six percent of the original gold content of the sludge redissolved. Greater than 99% of the sulfur content of the sludge was converted primarily to thiosulfate. The sulfur content decreased from 99 wt % in the sludge to 21 wt % in the residue. The pH of the thiosulfate-rich solution was maintained between pH 7.8 to pH 8.8 by using sodium carbonate ($Na_2CO_3$) as a base.

These examples demonstrate that the gold grade of the residue after treatment is increased over the gold grade of the feed material. The gold grade of the residue after treatment increases by the same factor independently of the reagent used or the sulfur grade of the feed material.

Example 4

Figure 3:
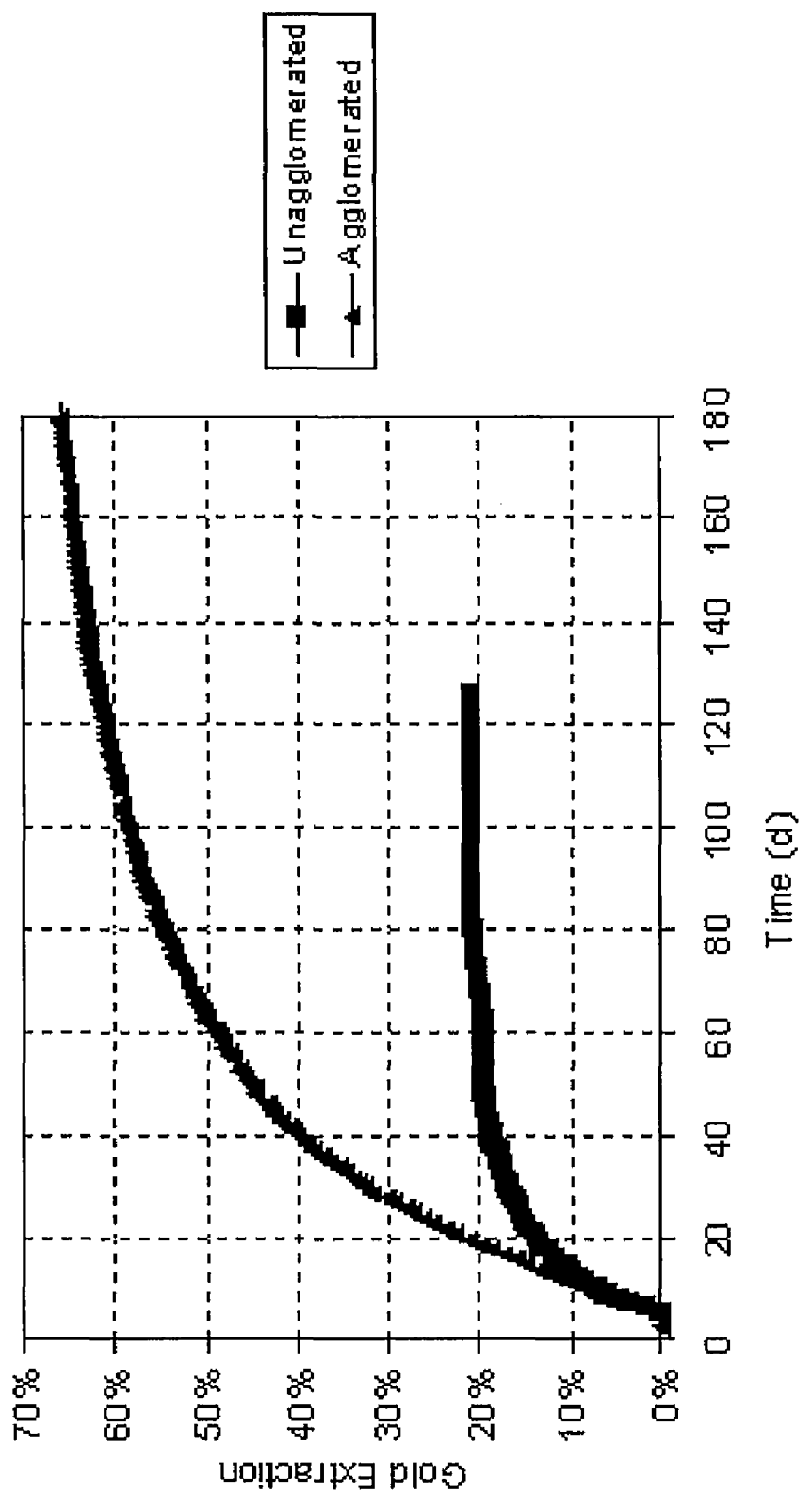
FIG. 3 is a plot of gold extraction in percent (vertical axis) against time (horizontal axis) with unagglomerated and agglomerated precious metal-containing ore.

In FIG. 3 the gold extraction from two large crib tests are shown. For both tests, the cribs that were used had a square cross-section that was 8 ft by 8 ft and ore was stacked into these cribs to a height of 20 ft. The ore for both tests was a carbonaceous preg-robbing gold ore.

Both cribs were irrigated with a solution that contained ammonium thiosulfate at a concentration of 10-15 g/L. The irrigation rate varied during the test for both tests, but was between 0.00125 and 0.0025 gpm/ft². The aeration rate for both tests was kept at 0.002 scfm/ft2.

For the unagglomerated crib, the ore was crushed to −2" and then placed in the crib. For the agglomerated crib, ore was crushed to −2", and then was mixed in a rotating drum for approximately 5 minutes with a solution of 15 g/L ammonium thiosulfate. This solution was added to the ore in an amount to produce a visually good agglomerate, but amounted to approximately 5% of the ore mass added.

As FIG. 3 shows, the gold extraction, when the ore is agglomerated using ammonium thio sulfate, is significantly better than when no agglomerating medium is used.

Example 5

In Tables 1 and 2, two column tests are shown—one aerated and one not. In both tests, carbonaceous preg-robbing gold ore was used. This ore was placed in 10 in.×8 ft. columns and was irrigated at 0.005 gpm/ft² for the unaerated column and 0.0025 gpm/ft² for the aerated column. The irrigation rate was changed for the aerated column to ensure that air, applied to the bottom of the column, could contact all of the ore.

These tables clearly show that when air is applied to a column, the dissolved oxygen level and Oxidation-Reduction Potential or ORP both increase. This results in an increase in gold extraction.

TABLE 1

Extraction, ORP (mV vs. Ag/AgCl) and dissolved $O_2$ content (DO2) as a function of solution applied for a 10 in. column with no air addition.

| Sol. Applied (kg/t) | ORP mV | DO2 mg/L | Extraction |
|---|---|---|---|
| 0.0 |  |  | 0% |
| 0.2 | 34 | 1.8 | 2% |
| 0.3 | −1 | 1.6 | 11% |
| 0.3 | −63 | 0.3 | 17% |
| 0.4 | −65 | 0.3 | 22% |
| 0.7 | −69 | 0.3 | 32% |
| 1.0 | −46 | 0.6 | 39% |
| 1.3 | −33 | 1.7 | 43% |
| 1.6 | −95 | 0.9 | 46% |
| 1.9 | −50 | 1.3 | 48% |
| 2.3 | −76 | 1.4 | 50% |
| 2.5 | −68 | 1.3 | 51% |
| 2.9 | −83 | 1.2 | 52% |

TABLE 2

Extraction, ORP (mV vs. Ag/AgCl) and DO2 as a function of solution applied for a 10 in. column with air added at 0.007 scfm/ft².

| Sol. Applied (kg/t) | ORP mV | DO2 mg/L | Extraction |
|---|---|---|---|
| 0.0 |  |  | 0% |
| 0.1 | 30 | 5.1 | 0% |
| 0.2 | 16 | 4.5 | 4% |
| 0.2 | 16 | 4.3 | 12% |
| 0.3 | 19 | 4.0 | 32% |
| 0.5 | 12 | 3.4 | 52% |
| 0.6 | 13 | 3.5 | 60% |
| 0.8 | 10 | 5.4 | 65% |
| 0.9 | 8 | 4.2 | 67% |
| 1.1 | 1 | 3.3 | 69% |
| 1.2 | 2 | 4.8 | 70% |
| 1.4 | 2 | 4.8 | 71% |
| 1.5 | −1 | 5.4 | 71% |

Example 6

Figure 4:
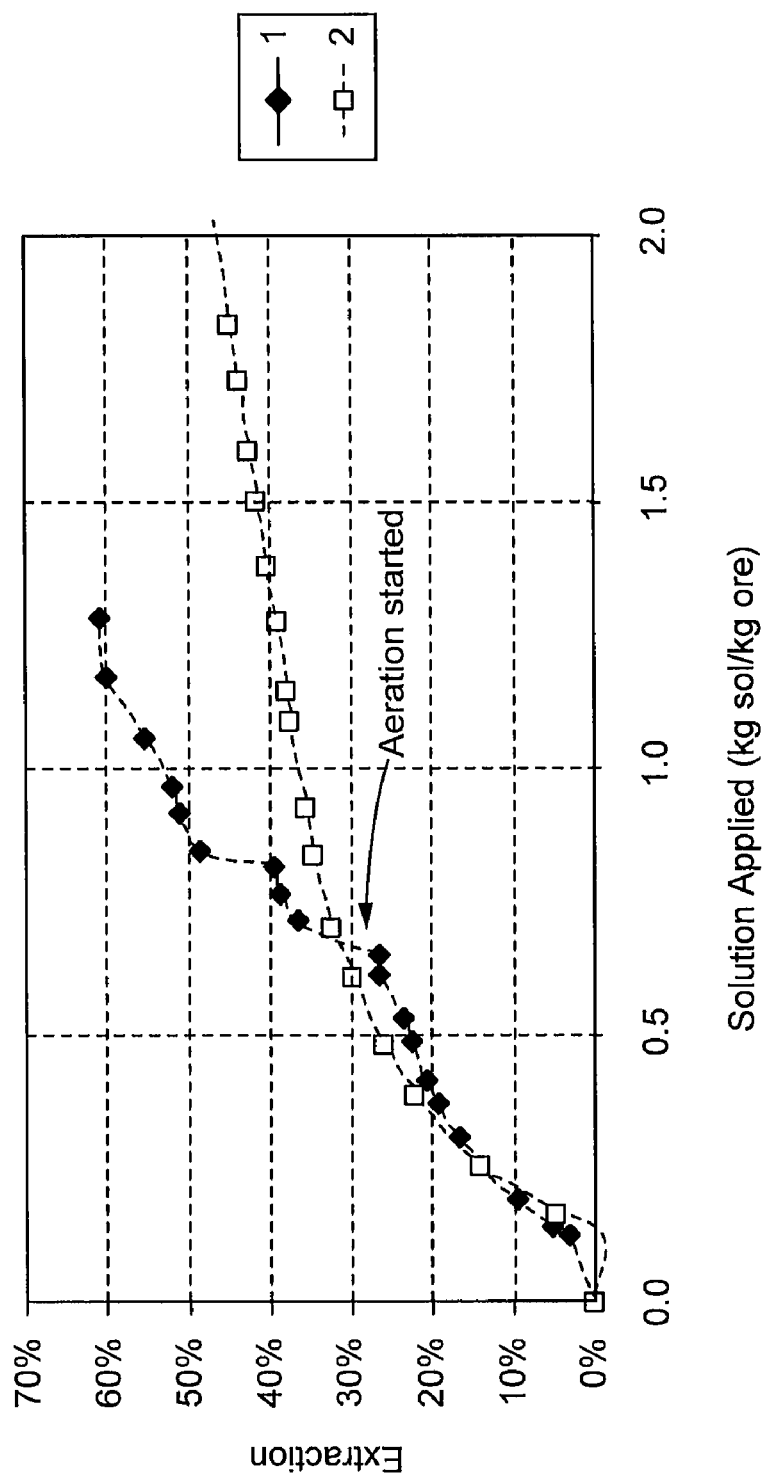
FIG. 4 is a plot of gold extraction in percent (vertical axis) against applied solution amount (horizontal axis) with and without heap aeration.

FIG. 4 shows the gold recovery from two columns. Again, in both tests, carbonaceous preg-robbing gold ore was used. This ore was placed in 10 in.×20 columns and was irrigated at 0.005 gpm/ft² for column 2 and 0.0025 gpm/ft² for column 1.

FIG. 4 shows that for these tests, before an application ratio of 0.6, recovery is independent of application rate. After this time, air was introduced to column 1 at a rate of 0.007 scfm/ft². As this figure shows, the application of air at this rate resulted in the gold extraction increasing significantly as compared to the unaerated test.

A number of variations and modifications of the invention can be used. It would be possible to provide for some features of the invention without providing others.

By way of example, any source of sulfur species with an oxidation state less than +2 may be used in any of the above process steps to convert polythionates to thiosulfate. The regeneration phase of the conditioning step 182 can be performed in a variety of locations. For example, regeneration phase can be performed in the recycle loop before or after fresh thiosulfate 148 addition and before comminution 200, between comminution 200 and thickening 208, in the thickener, and/or immediately before or during leaching 220.

Fresh thiosulfate 148 can also be added in a number of locations. For example, fresh thiosulfate 148 can be added in any of the locations referred to previously for the regeneration phase and can be added after or during regeneration as noted above or in a separate tank or location.

Figure 1B:
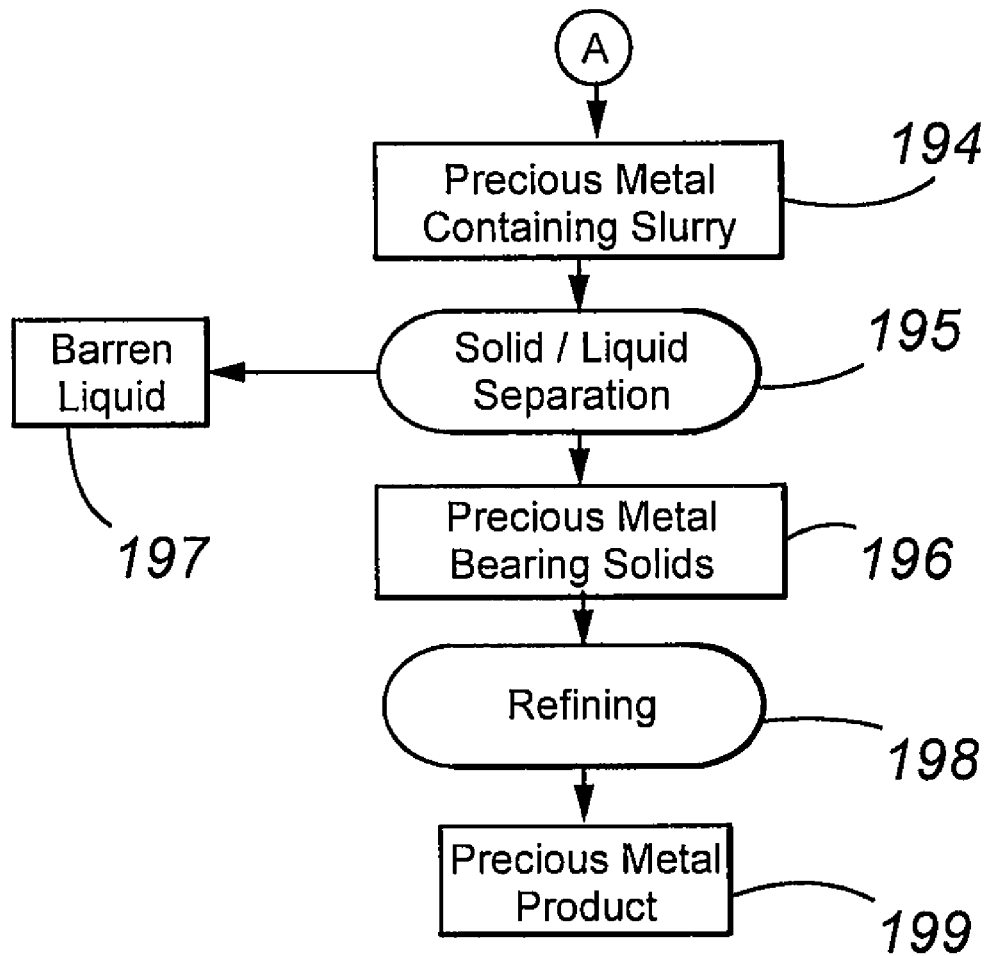
Figure 2B:
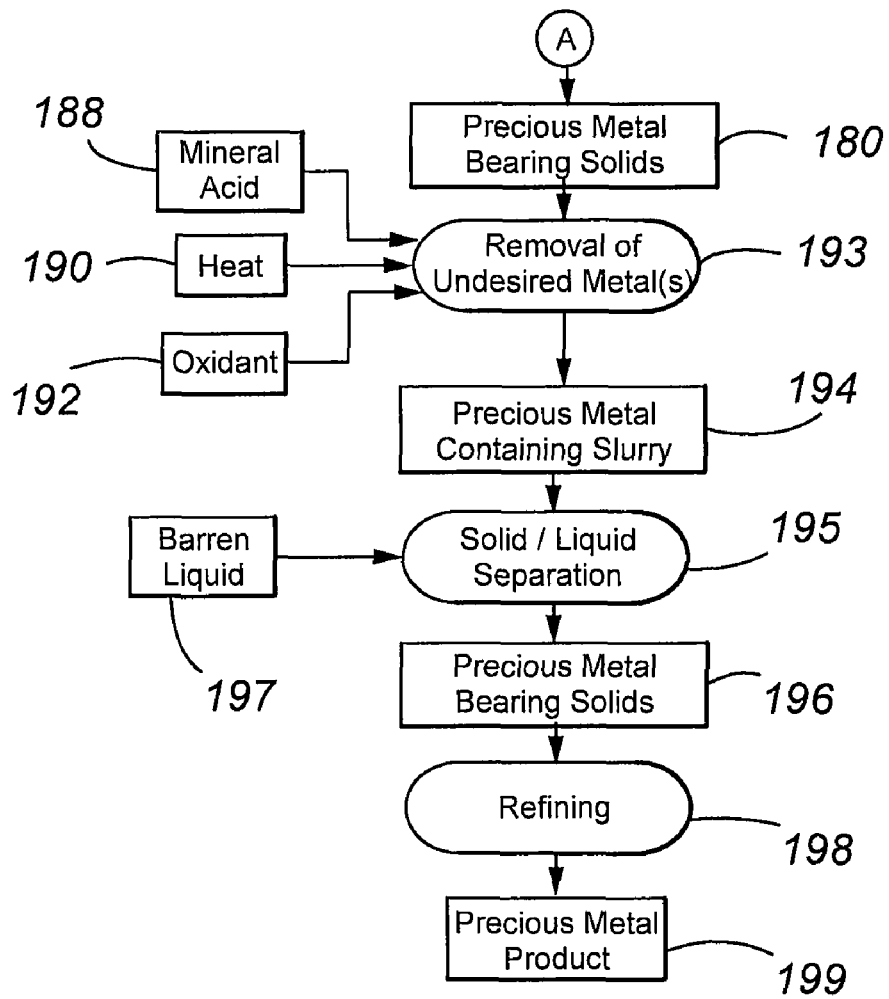

The present invention is not limited to the process configurations of FIGS. 1 and 2. For example, steps 140, 193, and 180 may be omitted from the depicted process configurations. Other process steps may be substituted for the depicted process steps. For example, the precious metals may be recovered by techniques other than sulfide precipitation in step 160. Such techniques include resin in pulp, electrowinning, cementation, ion exchange resins, cyanidation, direct refining, solvent extraction, and the like.

The processes to remove precious metals by sulfide precipitation followed by thiosulfate production are not limited to precious metals. The processes can be employed with non-precious metals as well.

Sulfates may be controlled by methods other than precipitation. Sulfates may be removed by membrane filtration, solvent extraction, and ion exchange.

Sulfates can be removed by adding calcium to a side stream of the thiosulfate lixiviant or other process effluent followed by liquid/solid separation to remove the precipitated gypsum from the lixiviant. This is shown by the optional use of the precious metal scavenging step. Calcium can be placed in the heap separate from the precious metal-bearing material 108. This is particularly attractive where agglomeration is not employed.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process, comprising:
   (a) contacting a thiosulfate lixiviant with a precious metal-containing material to form a pregnant leach solution, the pregnant leach solution comprising a dissolved precious metal, thiosulfate, polythionate, and sulfate; and
   (b) maintaining a dissolved sulfate concentration in the pregnant leach solution of no more than about 150 g/L, wherein, in step (b), sulfate is removed by membrane filtration.

2. The process of claim 1, wherein the maintaining step comprises:
   precipitating sulfates with calcium.

3. The process of claim 1, wherein the maintaining step comprises:
   removing sulfates from at least a portion of the pregnant leach solution and/or a solution derived therefrom.

4. The process of claim 2, wherein the calcium is from a calcium containing material, the calcium containing material selected from the group consisting of: calcium carbonate, calcium oxide, calcium chloride, calcium nitrate, calcium thiosulfate, calcium hydroxide, and mixtures thereof.

5. The process of claim 2, further comprising:
   (c) contacting the calcium with the pregnant leach solution and/or a solution derived therefrom, and wherein the amount of calcium is at least about 0.1 kg/tonne of precious metal-containing material.

6. A process, comprising:
   (a) contacting, in a precious metal extraction circuit, a thiosulfate lixiviant with a precious metal-containing material to form a pregnant leach solution, the pregnant leach solution comprising a dissolved precious metal, thiosulfate, polythionate, and sulfate;
   (b) maintaining a dissolved sulfate concentration in at least one of the pregnant leach solution and a barren lixiviant derived therefrom of no more than about 150 g/L, wherein, in step (b) sulfate is removed by ion exchange; and
   (c) recycling at least a portion of the barren lixiviant to an upstream step for reuse in the precious metal extraction circuit.

7. The process of claim 6, wherein the maintaining step comprises:
   precipitating sulfates with calcium.

8. The process of claim 6, wherein the maintaining step comprises:
   removing sulfates from at least a portion of the pregnant leach solution and/or a solution derived therefrom.

9. The process of claim 7, wherein the calcium is from a calcium containing material, the calcium containing material selected from the group consisting of: calcium carbonate, calcium oxide, calcium chloride, calcium nitrate, calcium thiosulfate, calcium hydroxide, and mixtures thereof.

10. The process of claim 7, wherein the maintaining step comprises:
   contacting the calcium with the pregnant leach solution and/or a solution derived therefrom and wherein the amount of calcium is at least about 0.1 kg/tonne of precious metal-containing material.

11. A process, comprising:
   (a) contacting, in a leaching circuit, a thiosulfate lixiviant with a precious metal-containing material to form a pregnant leach solution, the pregnant leach solution comprising a dissolved precious metal, thiosulfate, polythionate, and sulfate;
   (b) maintaining a dissolved sulfate concentration in at least one of the pregnant leach solution and a barren lixiviant derived therefrom of no more than about 150 g/L, wherein, in step (b), sulfate is removed by solvent extraction; and
   (c) recycling at least a portion of the barren lixiviant to an upstream step for reuse in the leaching circuit.

12. The process of claim 11, wherein the maintaining step comprises:
   precipitating sulfates with calcium.

13. The process of claim 11, wherein the maintaining step comprises:
   removing sulfates from at least a portion of the pregnant leach solution and/or a solution derived therefrom.

14. The process of claim 12, wherein the calcium is from a calcium containing material, the calcium containing material selected from the group consisting of: calcium carbonate, calcium oxide, calcium chloride, calcium nitrate, calcium thiosulfate, calcium hydroxide, and mixtures thereof.

15. The process of claim 12, wherein the maintaining step comprises:
   contacting the calcium with the pregnant leach solution and/or a solution derived therefrom and wherein the amount of calcium is at least about 0.1 kg/tonne of precious metal-containing material.

16. A process, comprising:
   (a) contacting a thiosulfate lixiviant with a precious metal-containing material to form a pregnant leach solution, the pregnant leach solution comprising a dissolved precious metal, thiosulfate, polythionate, and sulfate; and
   (b) maintaining a dissolved sulfate concentration in the pregnant leach solution of no more than about 150 g/L, wherein, in step (b), sulfate is removed by solvent extraction.

17. A process, comprising:
   (a) contacting a thiosulfate lixiviant with a precious metal-containing material to form a pregnant leach solution, the pregnant leach solution comprising a dissolved precious metal, thiosulfate, polythionate, and sulfate; and
   (b) maintaining a dissolved sulfate concentration in the pregnant leach solution of no more than about 150 g/L, wherein, in step (b) sulfate is removed by ion exchange.

18. A process, comprising:
   (a) contacting, in a precious metal extraction circuit, a thiosulfate lixiviant with a precious metal-containing material to form a pregnant leach solution, the pregnant leach solution comprising a dissolved precious metal, thiosulfate, polythionate, and sulfate;
   (b) maintaining a dissolved sulfate concentration in at least one of the pregnant leach solution and a barren lixiviant derived therefrom of no more than about 150 g/L, wherein, in step (b), sulfate is removed by membrane filtration; and
   (c) recycling at least a portion of the barren lixiviant to an upstream step for reuse in the precious metal extraction circuit.

19. A process, comprising:
   (a) contacting, in a precious metal extraction circuit, a thiosulfate lixiviant with a precious metal-containing material to form a pregnant leach solution, the pregnant leach solution comprising a dissolved precious metal, thiosulfate, polythionate, and sulfate;
   (b) maintaining a dissolved sulfate concentration in at least one of the pregnant leach solution and a barren lixiviant derived therefrom of no more than about 150 g/L, wherein, in step (b), sulfate is removed by solvent extraction; and
   (c) recycling at least a portion of the barren lixiviant to an upstream step for reuse in the precious metal extraction circuit.

20. A process, comprising:
   (a) contacting, in a leaching circuit, a thiosulfate lixiviant with a precious metal-containing material to form a pregnant leach solution, the pregnant leach solution comprising a dissolved precious metal, thiosulfate, polythionate, and sulfate;
   (b) maintaining a dissolved sulfate concentration in at least one of the pregnant leach solution and a barren lixiviant derived therefrom of no more than about 150 g/L, wherein, in step (b) sulfate is removed by ion exchange; and
   (c) recycling at least a portion of the barren lixiviant to an upstream step for reuse in the leaching circuit.

21. A process, comprising:
   (a) contacting, in a leaching circuit, a thiosulfate lixiviant with a precious metal-containing material to form a pregnant leach solution, the pregnant leach solution comprising a dissolved precious metal, thiosulfate, polythionate, and sulfate;
   (b) maintaining a dissolved sulfate concentration in at least one of the pregnant leach solution and a barren lixiviant derived therefrom of no more than about 150 g/L, wherein, in step (b), sulfate is removed by membrane filtration; and
   (c) recycling at least a portion of the barren lixiviant to an upstream step for reuse in the leaching circuit.

* * * * *